(12) United States Patent
Hyodo et al.

(10) Patent No.: US 8,488,941 B2
(45) Date of Patent: Jul. 16, 2013

(54) CODED DATA CONTROL DEVICE

(75) Inventors: Masaaki Hyodo, Chiba (JP); Hiroshi Kusao, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1321 days.

(21) Appl. No.: 11/898,123

(22) Filed: Sep. 10, 2007

(65) Prior Publication Data

US 2008/0069523 A1 Mar. 20, 2008

Related U.S. Application Data

(63) Continuation of application No. 09/437,239, filed on Nov. 10, 1999, now Pat. No. 7,274,858, which is a continuation of application No. 08/843,490, filed on Apr. 16, 1997, now Pat. No. 6,021,250.

(30) Foreign Application Priority Data

Jul. 29, 1994 (JP) .................................... 6-179000

(51) Int. Cl.
*H04N 9/80* (2006.01)

(52) U.S. Cl.
USPC ........................................ 386/241; 386/345

(58) Field of Classification Search
USPC ........................................ 386/200, 241, 345
See application file for complete search history.

(56) References Cited

U.S. PATENT DOCUMENTS

| 5,043,534 | A |  | 8/1991 | Mahulikar et al. |
| 5,455,684 | A |  | 10/1995 | Fujinami et al. |
| 5,481,543 | A | * | 1/1996 | Veltman ..................... 370/473 |
| 5,535,008 | A |  | 7/1996 | Yamagishi et al. |
| 5,546,365 | A |  | 8/1996 | Roth |
| 6,006,007 | A |  | 12/1999 | Honjo |
| 6,021,250 | A |  | 2/2000 | Hyodo et al. |

FOREIGN PATENT DOCUMENTS

| EP | 0 460 751 A2 | 12/1991 |
| EP | 0 460 764 A1 | 12/1991 |
| EP | 0 545 323 A1 | 6/1993 |
| EP | 0 570 922 A2 | 11/1993 |
| EP | 0 606 157 A2 | 7/1994 |
| EP | 0 606 868 A2 | 7/1994 |
| EP | 0 667 713 A2 | 8/1995 |
| JP | 63311887 | 12/1988 |
| JP | 3-129979 | 6/1991 |
| JP | 04318375 | 11/1992 |
| JP | 05036250 | 2/1993 |
| JP | 5-85110 | 6/1993 |
| JP | 7-87443 A | 3/1995 |
| TW | 189634 | 8/1992 |
| WO | WO 94/07332 | 3/1994 |

\* cited by examiner

*Primary Examiner* — Huy T Nguyen
(74) *Attorney, Agent, or Firm* — Nixon & Vanderhye, P.C.

(57) ABSTRACT

Necessary coded data only can be read out at random accessing even with recording medium having coded data recorded thereon but whose code quantity is out of proportion to time. Once a recording medium was loaded into a recorder-player connected with a coded-data control device, the device reads control data from the recording medium and stores the data in a coded data control portion. At random accessing, the control data is read-out from the coded-data control portion and entered into a recording medium controller which in turn controls the recording medium to read-out only desired data according to the information inputted from the coded data control portion. In random access playback, fast playback from the midway of a video-sequence can be realized by accessing coded data of a video frame by using control data.

10 Claims, 29 Drawing Sheets

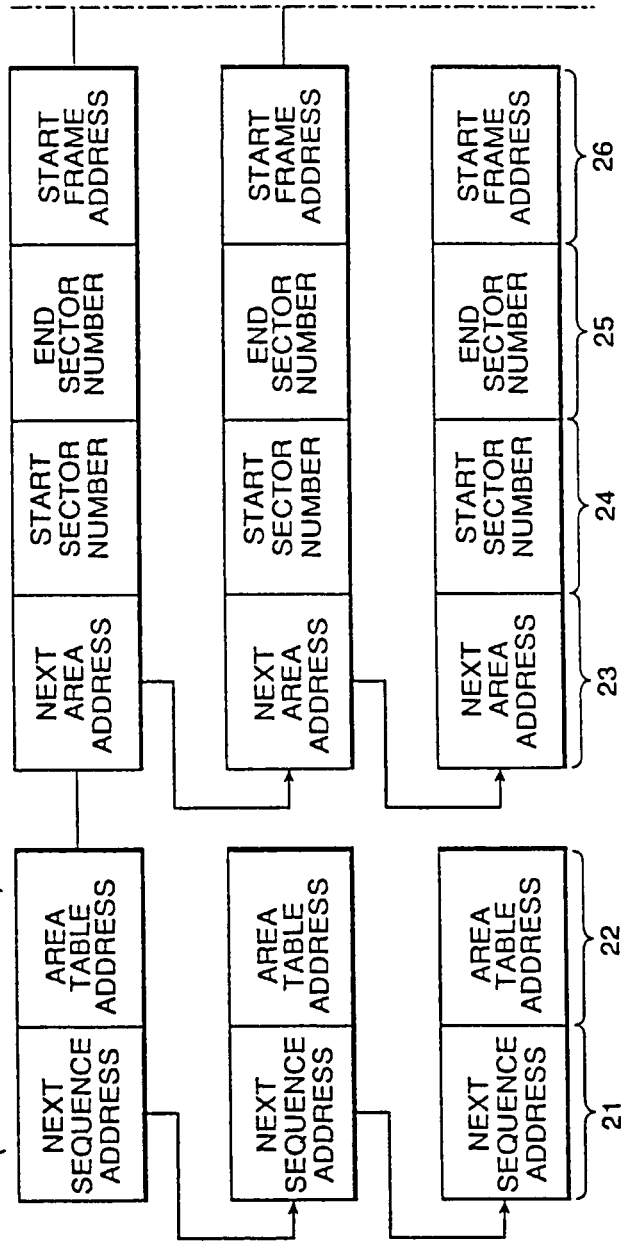

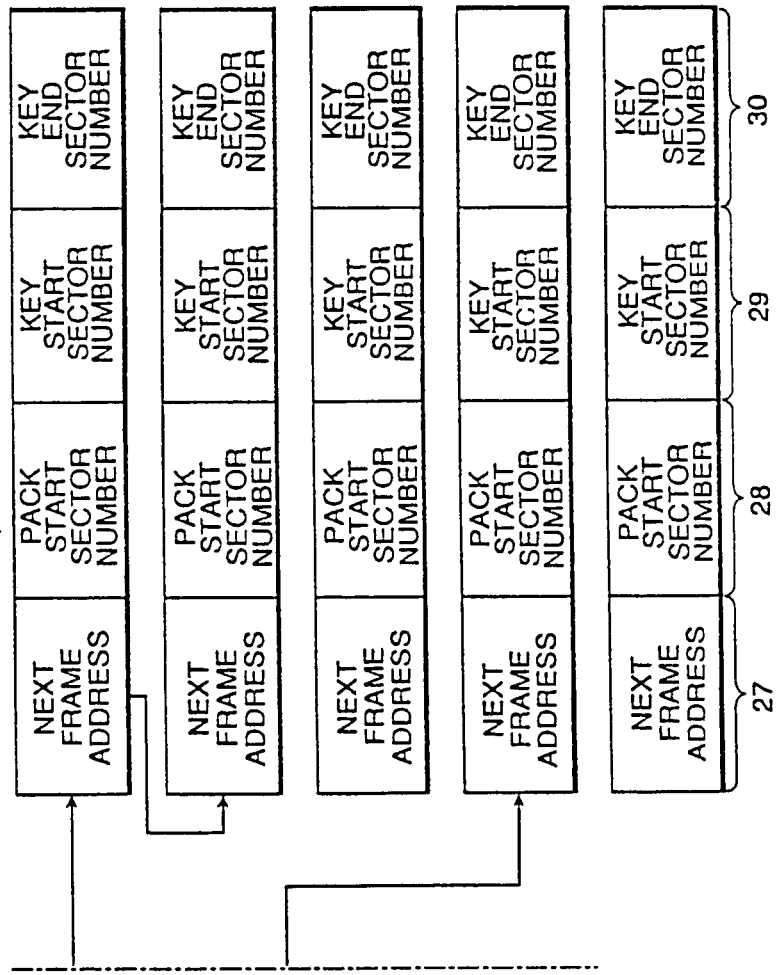

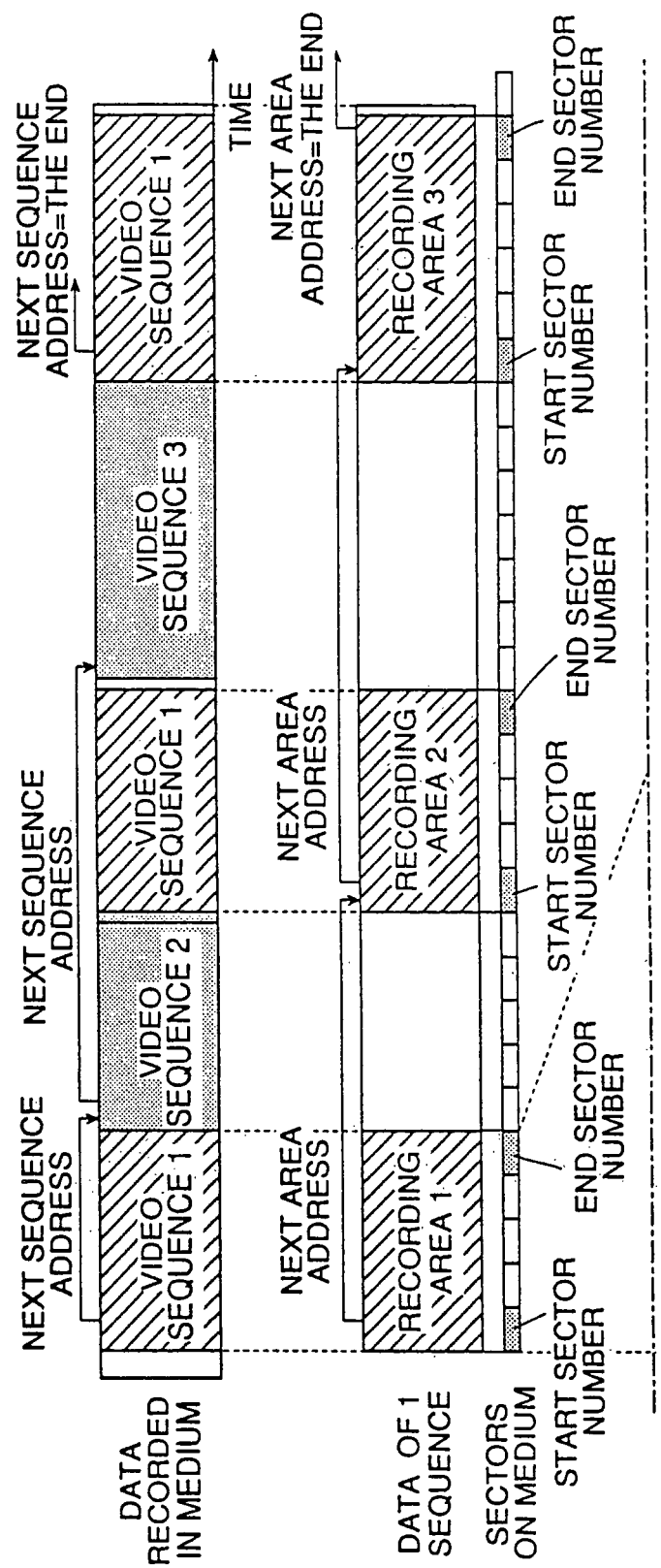

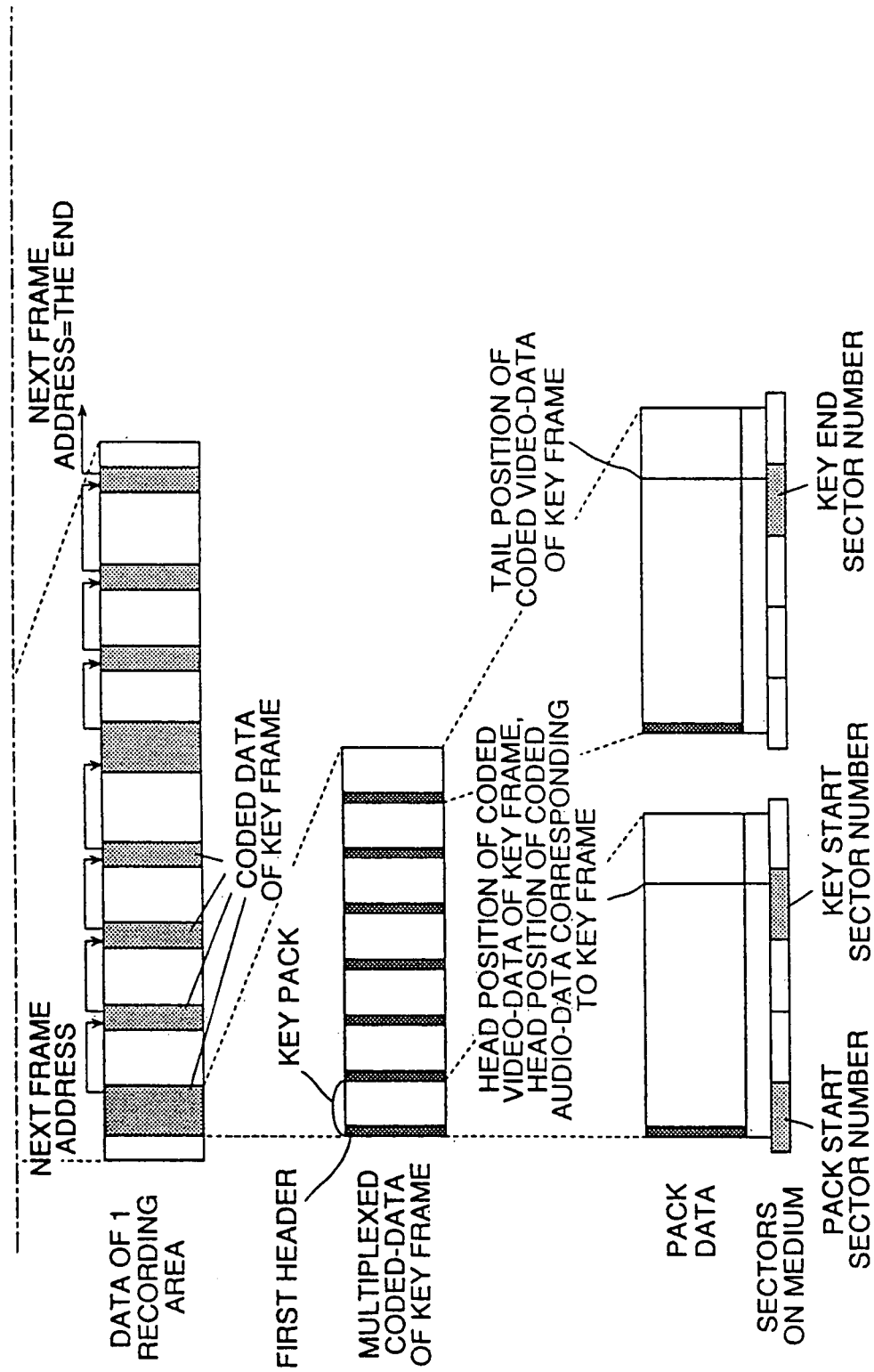

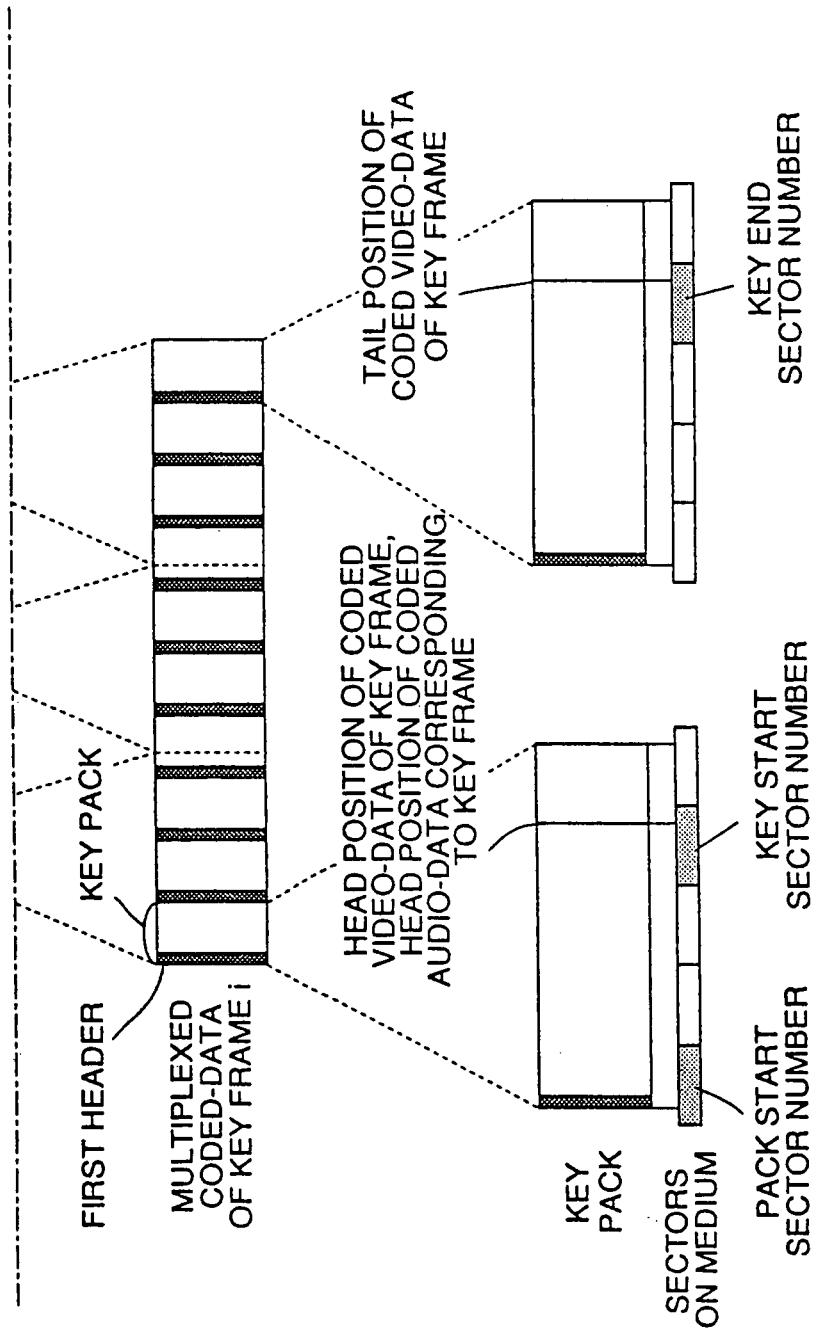

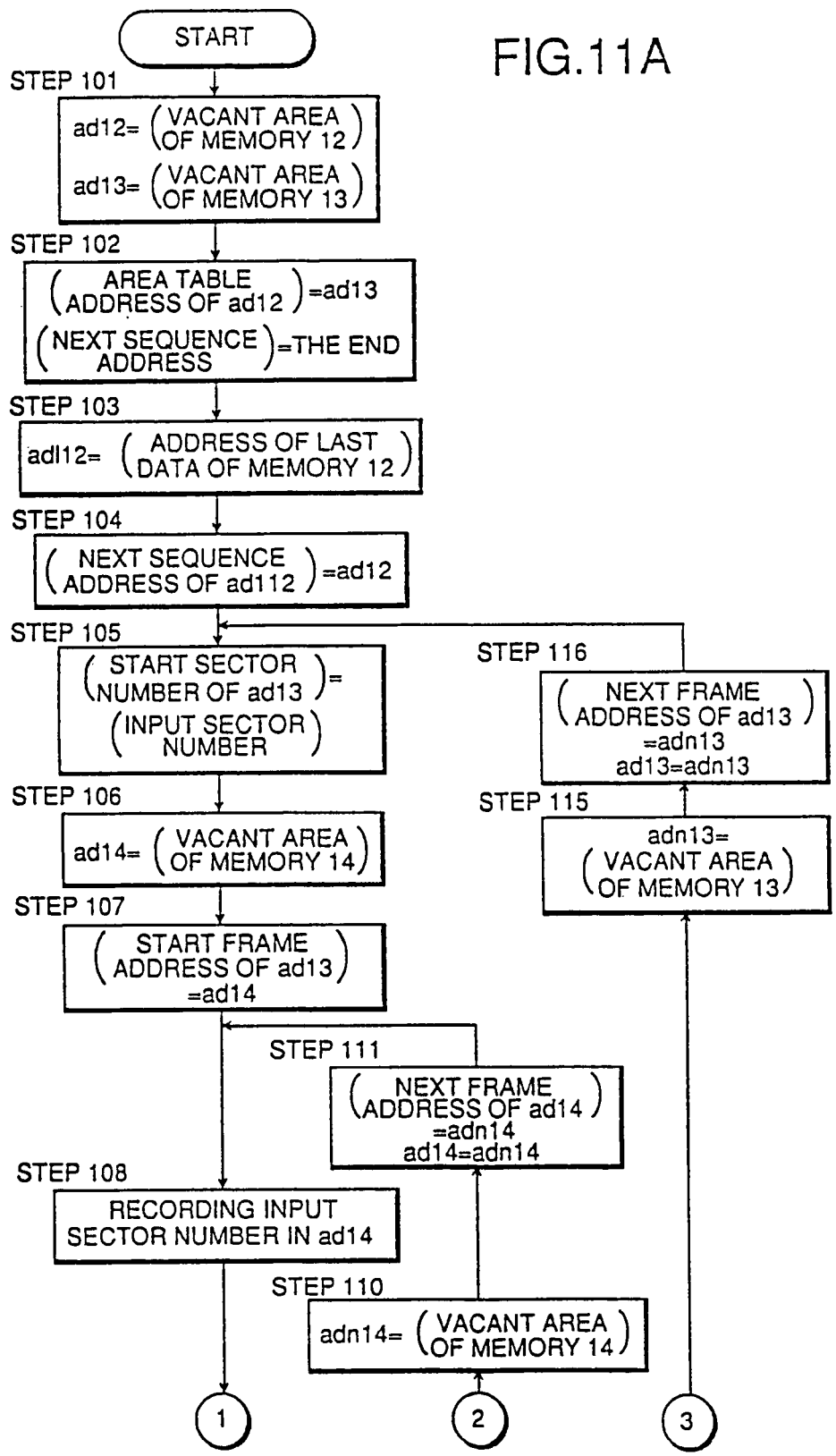

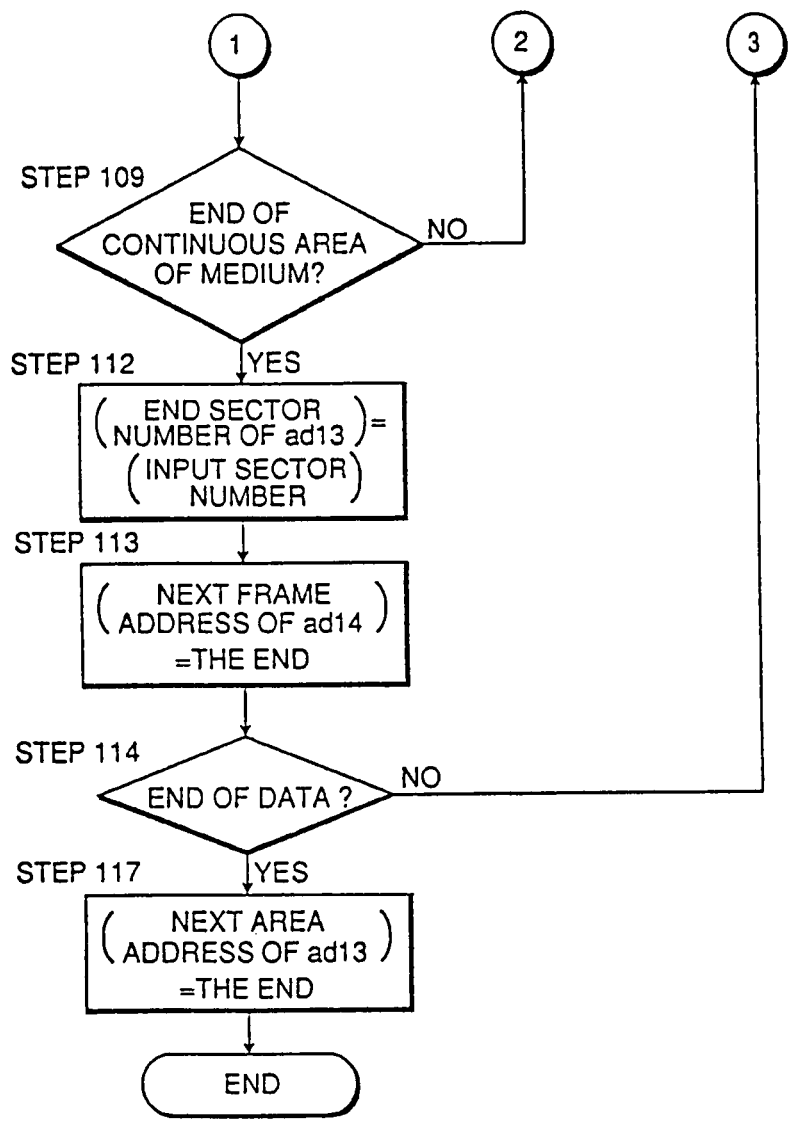

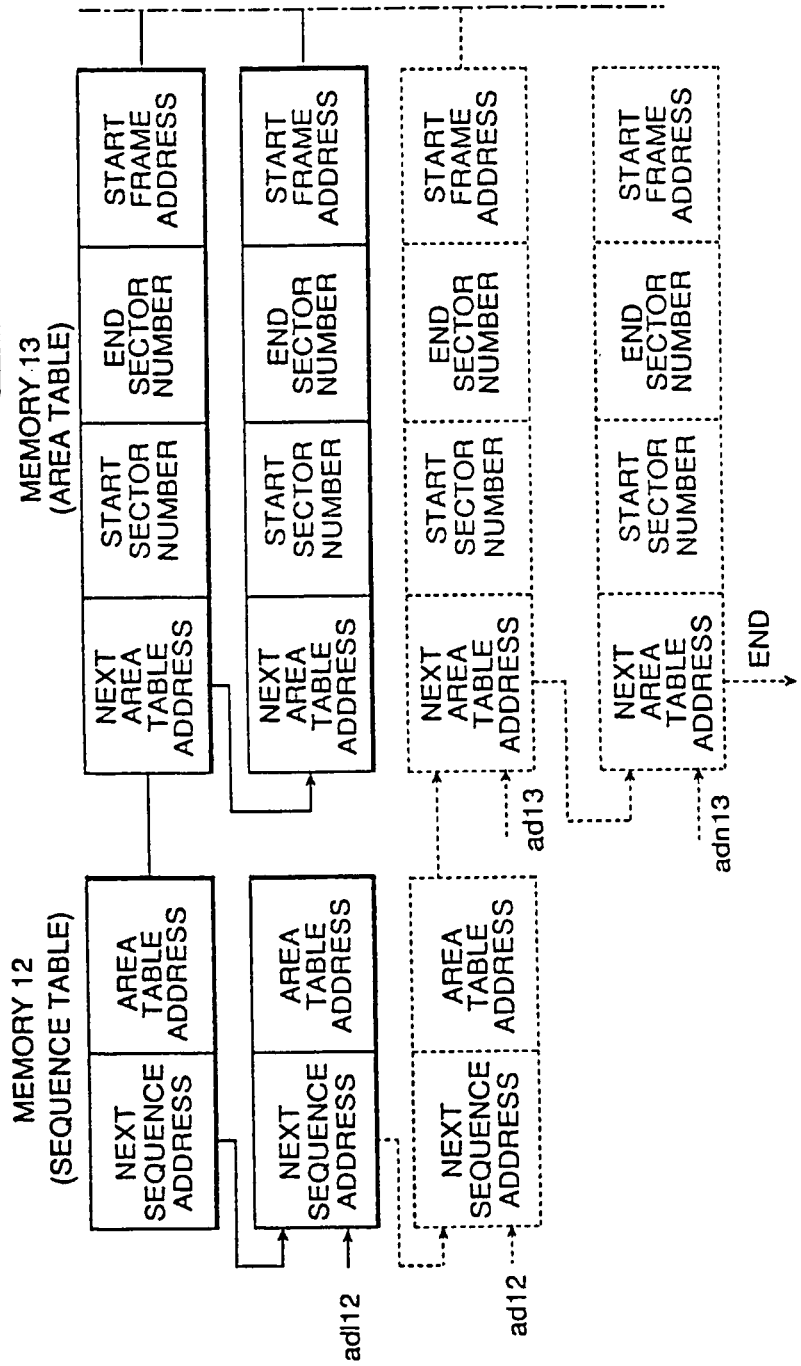

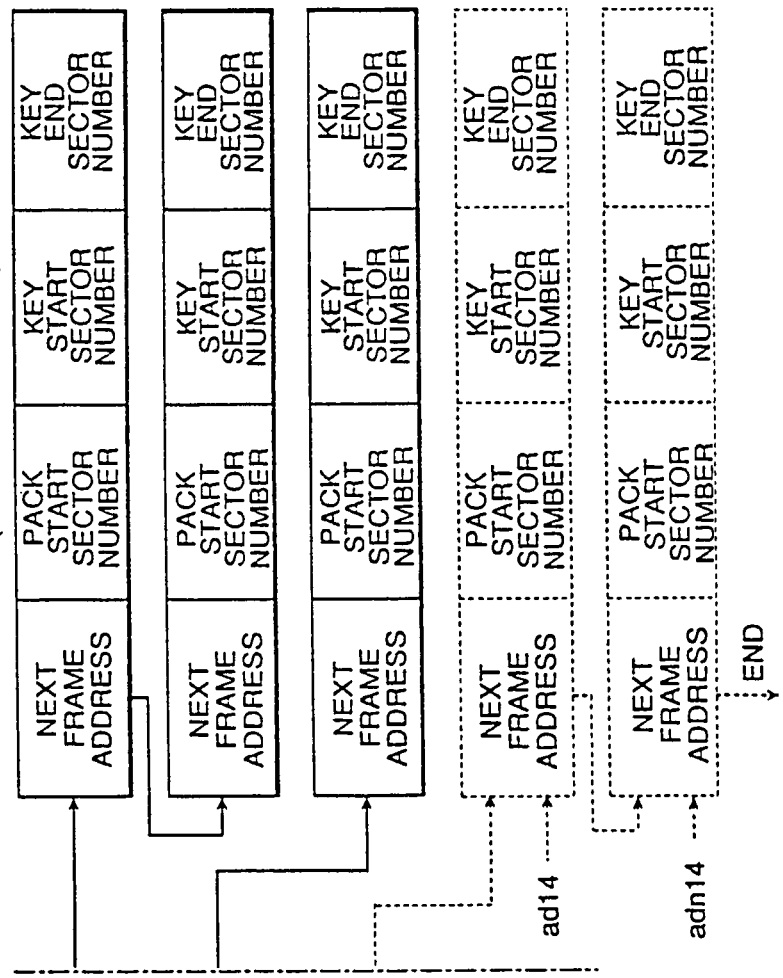

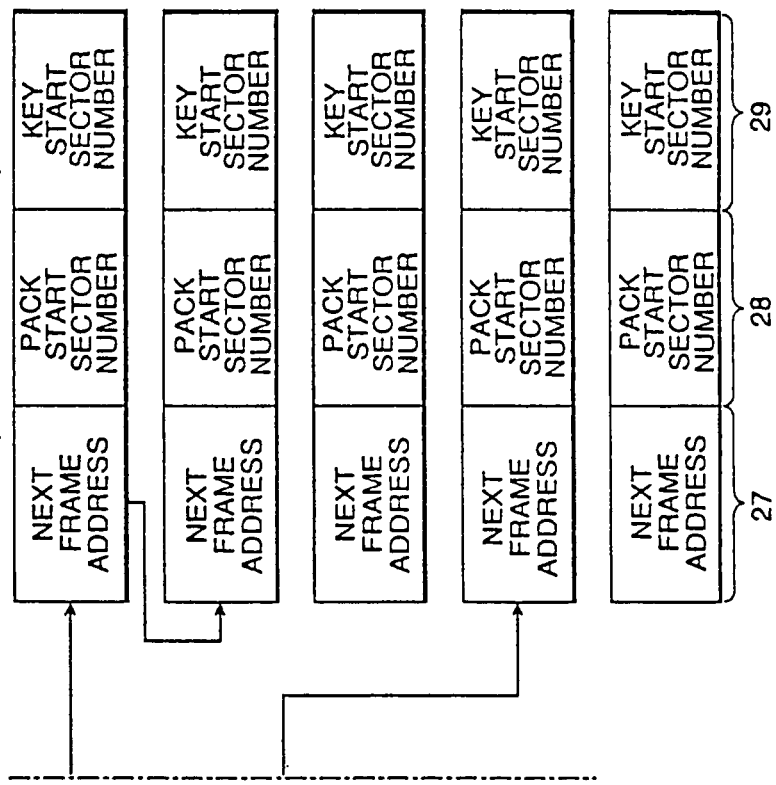

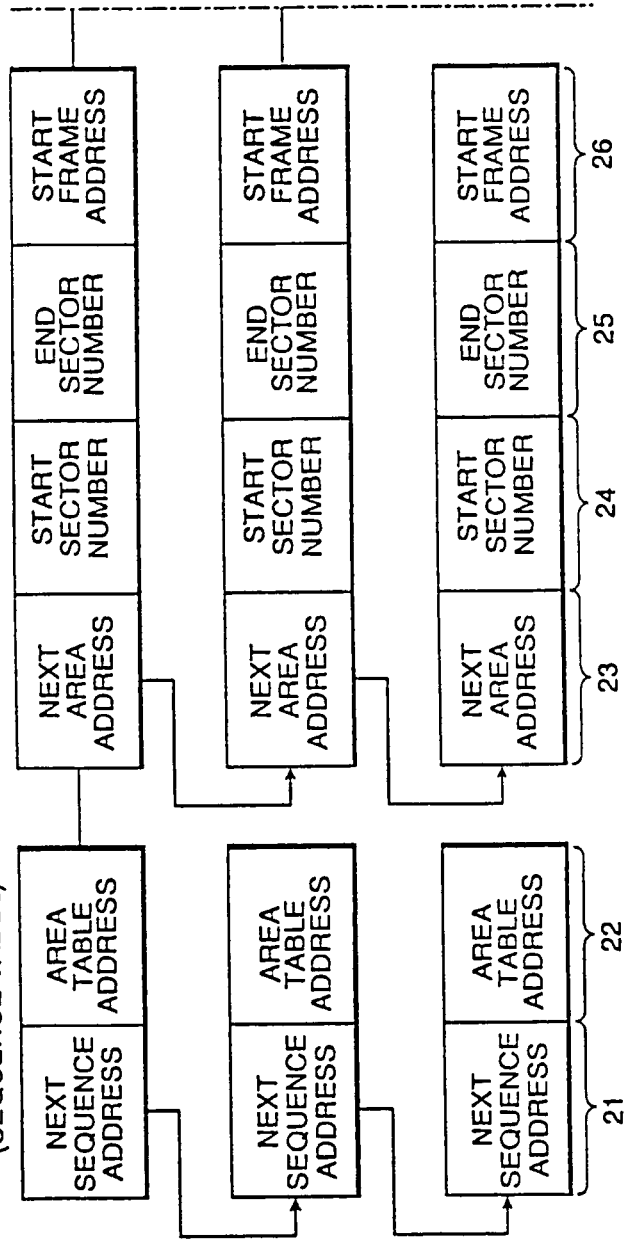

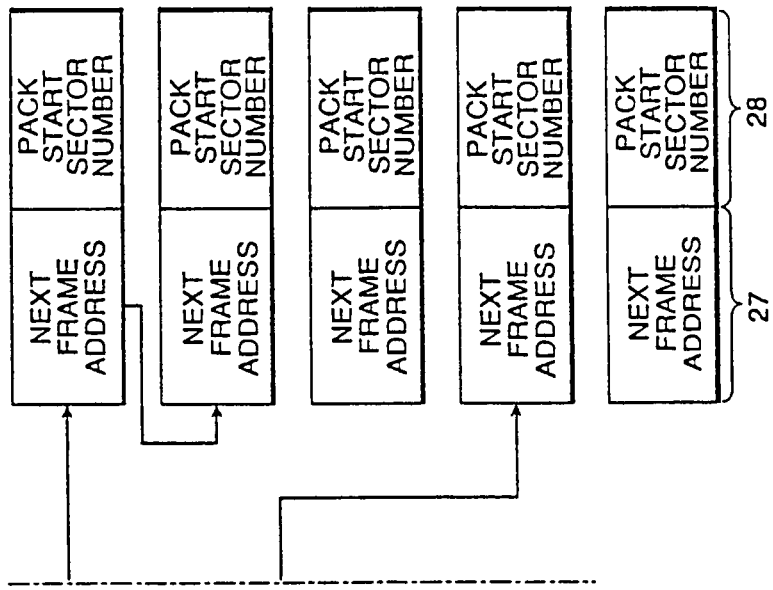

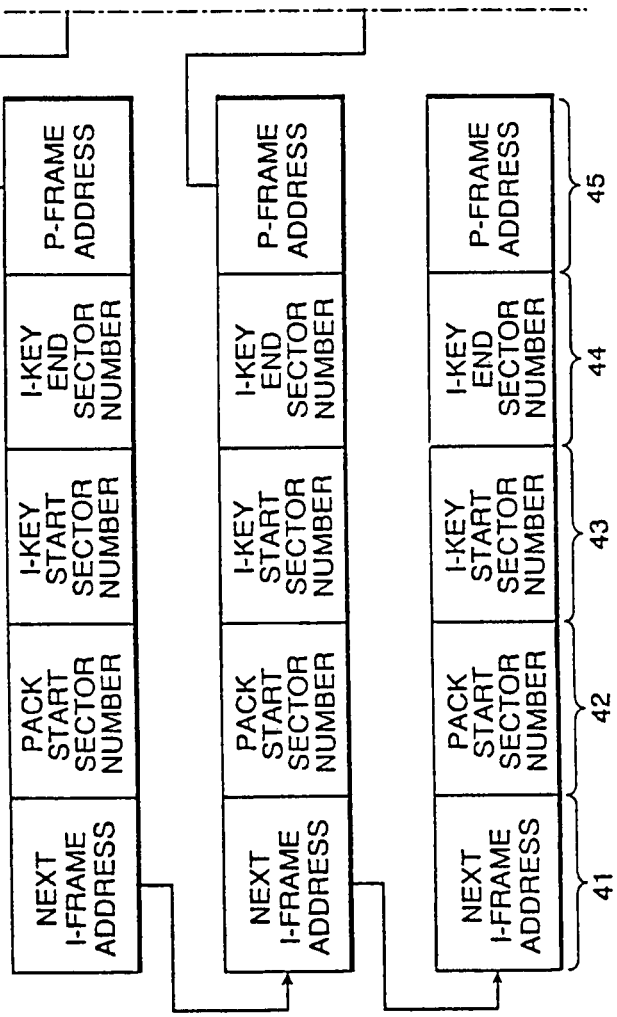

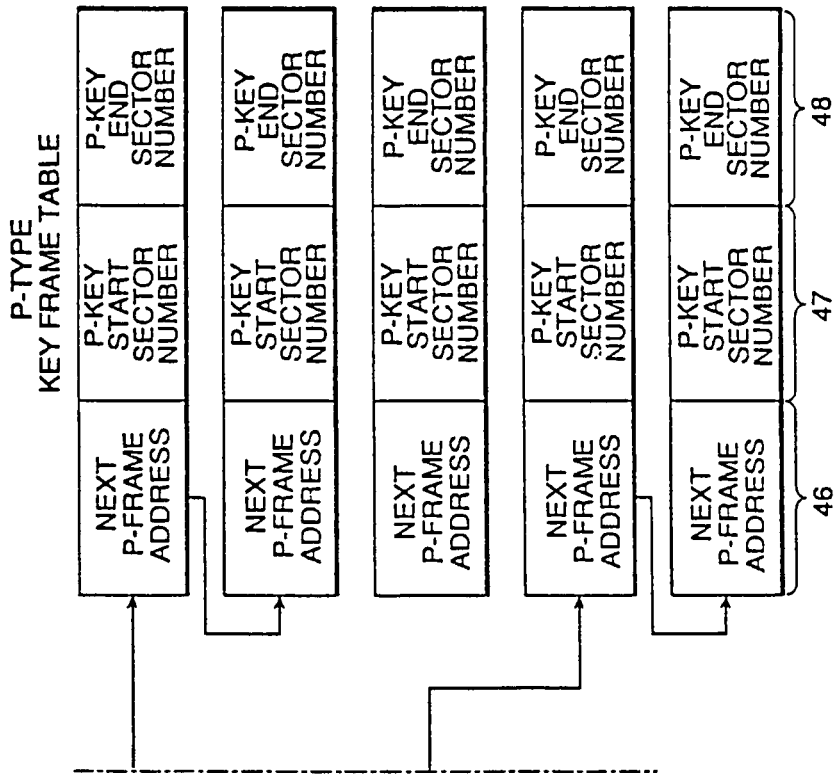

FIG.21

| FIG.21A | FIG.21B |

FIG.21A

MEMORY 13 (AREA TABLE)

| NEXT AREA ADDRESS | START SECTOR NUMBER | END SECTOR NUMBER | START FRAME ADDRESS | USED OR UNUSED |
|---|---|---|---|---|
| NEXT AREA ADDRESS | START SECTOR NUMBER | END SECTOR NUMBER | START FRAME ADDRESS | USED OR UNUSED |
| NEXT AREA ADDRESS | START SECTOR NUMBER | END SECTOR NUMBER | START FRAME ADDRESS | USED OR UNUSED |
| NEXT AREA ADDRESS | START SECTOR NUMBER | END SECTOR NUMBER | START FRAME ADDRESS | USED OR UNUSED |
| 23 | 24 | 25 | 26 | 51 |

MEMORY 12 (SEQUENCE TABLE)

| NEXT SEQUENCE ADDRESS | SECTOR TABLE ADDRESS | USED OR UNUSED |
|---|---|---|
| NEXT SEQUENCE ADDRESS | SECTOR TABLE ADDRESS | USED OR UNUSED |
| NEXT SEQUENCE ADDRESS | SECTOR TABLE ADDRESS | USED OR UNUSED |
| 21 | 22 | 52 |

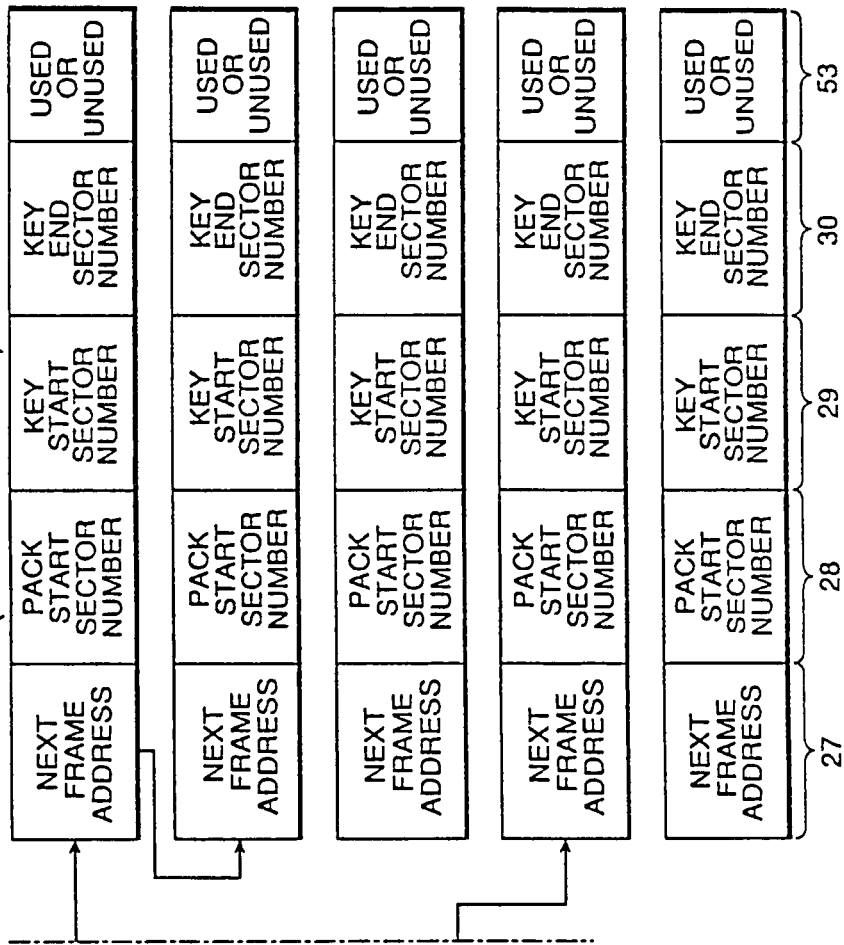

CODED DATA CONTROL DEVICE

This application is a continuation application of U.S. patent application Ser. No. 09/437,239 filed Nov. 10, 1999, now U.S. Pat. No. 7,274,858 which is a continuation of U.S. patent application Ser. No. 08/843,490, filed Apr. 16, 1997, now granted as U.S. Pat. No. 6,021,250, which claims priority under 35 U.S.C. §119(a) on Japanese Application 6-17900 filed Jul. 29, 1994, all of which are incorporated herein by reference.

BACKGROUND OF THE INVENTION

The present invention relates to a coded data control device and more particularly to coded data control device for use in a digital video recorder-player which uses a read-only recording medium such as a CD-ROM and a rewritable recording medium such as an optical magnetic disk.

Disc-recording media such as a magnetic disc, optical disc, optical magnetic disc and so on allow high-speed random accessing any location of data recorded therein. The use of the quick random access recording medium makes it possible to reproduce data recorded in different areas thereof as a sequence of continuously recorded data. Video data has a very high data rate and can not easily be recorded into the recording medium without previously being processed. However, by high efficiently encoding video and audio signals it is possible to reduce the data rate of them to a degree whereat the data may be recorded in the disc medium without decreasing quality of video and audio data.

An example of a known high-efficiency coding method is a MPEG (Moving Picture Experts Group) method which has been promoted to be standardized by ISO-IEC/JTC1/SC29/WG11 as a method of high-efficiently encoding video and audio signals and multiplexing for synchronous reproduction of the signals. Video coding by the MPEG method uses a group of pictures (GOP) for example consisting of 12 or 15 video frames as a unit to be coded by prediction.

Video frames in a GOP classified into I(Intra picture)-frames, P(Predictive picture)-frames and B(Bidirectional picture)-frames. An I-frame is to be intraframe-coded. A P-frame is to be coded by forward predicting from the I-frame or by forward predicting from another P-frame. A B-frame is located between an I-frame and a P-frame or between P-frames and encoded by bi-directional predicting from an I-frame and a P-frame or from a precedent and subsequent P-frames.

To reproduce the GOP, it is necessary to decode I-frame first since P-frames and B-frames are encoded by prediction from an I-frame or from a video-frame coded by prediction from an I-frame. Otherwise, all other frames can not be decoded. Namely, in case of reproducing video from a midway of it in sequence, it is needed to start decoding an I-frame. P-frames can be decoded easier than B-frames since they are coded by prediction from a preceding frame only.

I-frames and P-frames are hereinafter referred to as key-frames. A video sequence denotes a series of successive video-frames recorded for an interval between the moment recording starts and the moment recording ends and a series of corresponding coded data. A quantity of codes obtained by the MPEG coding method is substantially constant in average but is out of proportion to time in a short period. Consequently, spacing between coded video-data in each frame is not constant and recording positions of coded data in each frame can not be uniquely determined. It is, therefore, difficult to reproduce discrete video-frames continuously, like fast playback.

In Japanese laid-open patent publication No. 5-153577, there is disclosed an example of a conventional art for realizing fast playback of high-efficiently coded data. This method reads data from a disc medium at an increased speed, selects necessary data from the successively read-out data and reproduces them at a high speed.

As mentioned above, the prior art method reads out an increased quantity of data by increasing a reading speed but not using random accessing and selects therefrom data necessary for fast playback. The playback speed may increase as the data reading-out speed increases. However, increasing the data reading-out speed is limited to an extent and, therefore, the playback speed can not be enough increased.

To realize higher speed playback, it may be considered to read a disc recording medium by skipping unnecessary parts by using a random accessing technique. Namely, by repeating a cycle of data reading with subsequent quick jumping it is possible to change a speed of fast playback by each jumping value. However, in case of reading high-efficiently coded data, there may arise such a problem that when a jump is made to start reproduction from a midway of a video sequence, an I-frame shall be first decoded as aforementioned but a start point, i.e., coded video-data recorded therein can not be found because a quantity of codes is out of proportion to time.

The above-mentioned prior art method can not access data at random in a specified period and, therefore, can not realize features such as index searching and pointer edition using a random access. The index searching feature is to synchronously reproduce video output and audio output from a specified moment by using the random accessing function. The prior art requires much time for reading unnecessary data before finding multiplexed coded-data necessary for reproduction because location of an I-frame is unknown.

As aforementioned, high-speed playback of a disc medium is realized by reproducing only key frames, omitting unnecessary video frames. This requires repeating an operation cycle consisting of reading coded video-data and subsequent quick random accessing a next necessary data. The prior art can not find location of records of coded video-data of the key frames and, therefore, has to read a wide range of multiplexed coded-data including the key frames, resulting in decreasing the number of video-frames to be reproduced in a unit time. The pointer editing is used to designate a plurality of starting points and ending points and links a plurality of time-discrete data by using logical pointers without copying them. It assures synchronous reproduction of video output and audio output. In this case, it is also necessary to repeat a random access from one specified area to another area in the disc recording medium for reproduction. To get successively reproduced data, it is necessary to force a decoder to output reproduced data for a period no data is obtained. For this purpose, a code buffer must be provided for supplying coded data to be outputted by the decoder for an idling-period.

The prior art may read unnecessary data at every random access, causing need for supplying buffer coded data for every period no coded-data to be decoded is obtained. The data readable from the disc medium is multiplexed coded-data having an added thereto header that must be read first when synchronously reproducing video and audio outputs.

A multiplexed coded-data is divided into so called packs, each of which has a first header placed at the head thereof. Each pack is composed of coded video-data with a second header and coded audio-data with a second header. The first header contains an information for synchronizing coded video-data with coded audio-data. The second header contains an information indicating kinds of the data following thereto. Therefore, the first header must be first read out to realize synchronous reproduction of video and audio.

SUMMARY OF THE INVENTION

It is an object of the present invention to provide a coded data control device which is capable of reading only necessary data at the time of random access even in case that the number of codes is out of proportion to time.

It is another object of the present invention to provide a coded data control device which is possible to search whereabouts of records of necessary reproducible data in a recording medium by using control data stored in the recording medium, at high-speed-playback and image edition of the coded data on the recording medium by using a random access function can be realized even in case a quantity of codes recorded in the recording medium is out of proportion to time.

It is another object of the present invention to provide a coded data control device which is possible to search location of records of coded video-data or coded audio-data or multiplexed coded-data composing a key frame on a recording medium by using control data. Namely, in reproducing coded data by using random access function for index searching, high-speed playback and pointer edition, it is easy to know whereabouts of records of data on the recording medium, which are required to be read and reproduced.

It is another object of the present invention to provide a coded data control device, in which an information on location of records of multiplexed coded-data on a recording medium is used when synchronously reproducing video output and audio output and an information on location of coded video-data on the recording medium is used when reproducing only video output. Namely, in the former case it is possible to find positions of the multiplexed coded-data necessary for synchronously reproducing video and audio, while in the latter case it is possible to find positions of necessary coded video-data on the recording medium.

It is another object of the present invention to provide a coded data control device, in which control data is recorded as a control hierarchy corresponding to a video sequence, a recording area on a recording medium and a key frame in a recording area and uses pointers indicating an order of reproducing in each table and pointers indicating linkage of one table with another. This feature makes it possible to easily perform recording and erasing a video sequence, changing the order of reproducing video sequences, erasing a part of a video sequence and changing an order of reproducing data in a video sequence.

It is another object of the present invention to provide a coded data control device, in which control data for key frames is recorded as a hierarchy of control data for I-frames and a hierarchy of control data for P-frames. Therefore, I-frames and P-frames can be easily searched and accessed.

It is another object of the present invention to provide a coded data control device which is possible to easily know whether each memory for storing control data is occupied or vacant by one-bit flags indicating a "used" or "unused" state, which are added one to each word in each memory. This makes it possible to easily find a vacant area of each table.

It is another object of the present invention to provide a coded data control device, in which control data can be generated and organized in case if control data is not stored in a recording medium. This makes it possible to perform quick random access of records of the recording medium that no control data was previously recorded therein.

BRIEF DESCRIPTION OF DRAWINGS

FIGS. 8A and 8B show an example of control data recorded in memories shown in FIG. 7.

FIGS. 9A and 9B are views showing a relationship between control data recorded in a coded data control portion and a recording area of a recording medium according to the present invention.

FIGS. 11A and 11B are flow charts for explaining how a coded-data control portion of a coded-data control device according to the present invention operates when recording coded data.

FIGS. 12A and 12B are views for updating of a coded-data control portion of the device according to the present invention when recording coded data.

FIGS. 16A and 16B show another example of control data recorded in a coded-data control portion according to the present invention.

FIGS. 17A and 17B show another example of control data recorded in a coded-data control portion according to the present invention.

FIGS. 20A and 20B show an example of data recorded in a key-frame table for I-frames and a key-frame table for P-frames according to the present invention.

FIGS. 21A and 21B show how to add a 1-bit flag for indicating a used or unused area to each of words in each table according to the present invention.

PREFERRED EMBODIMENTS OF THE INVENTION

Figure 1:
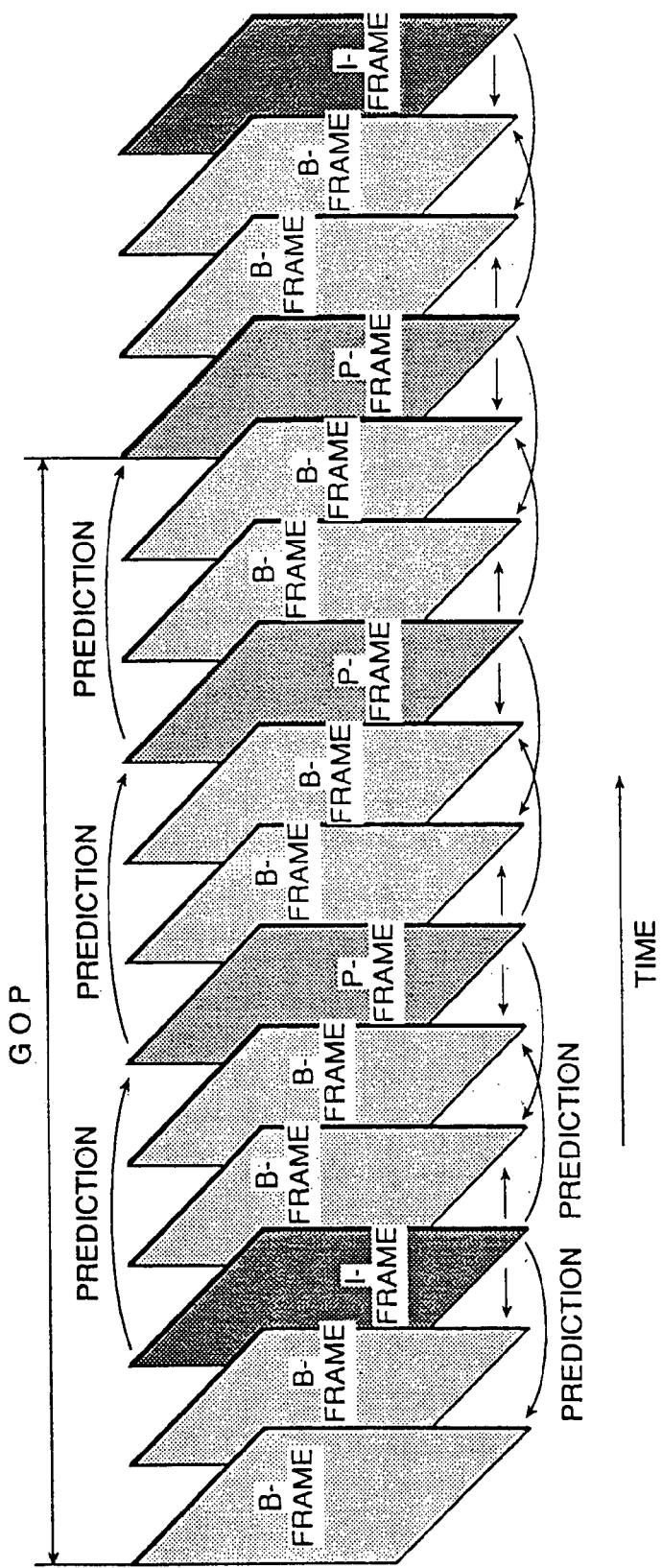
FIG. 1 is a view showing an example of structure of a conventional group of pictures.

FIG. 1 shows an exemplified structure of a GOP. Video frames in the GOP classified into I-frames, P-frames and B-frames. An I-frame is to be intraframe-coded. A P-frame is to be coded by forward predicting from the I-frame or by forward predicting from another P-frame. A B-frame is located between an I-frame and a P-frame or between P-frames and encoded by bi-directional predicting from an I-frame and a P-frame or from a precedent and subsequent P-frames.

To reproduce the GOP, it is necessary to decode I-frame first since P-frames and B-frames are encoded by prediction from an I-frame or from a video-frame coded by prediction from an I-frame. Otherwise, all other frames can not be decoded. Namely, in case of reproducing video from a midway of it in sequence, it is needed to start decoding an I-frame. P-frames can be decoded easier than B-frames since they are coded by prediction from a preceding frame only.

A quantity of codes obtained by the MPEG coding method is substantially constant in average but is out of proportion to time in a short period. Consequently, spacing between coded video-data in each frame is not constant and recording positions of coded data in each frame can not be uniquely determined. It is, therefore, difficult to reproduce discrete video-frames continuously, like fast playback.

To realize higher speed playback, it may be considered to read a disc recording medium by skipping unnecessary parts by using a random accessing technique. Namely, by repeating a cycle of data reading with subsequent quick jumping it is possible to change a speed of fast playback by each jumping value. However, in case of reading high-efficiently coded data, there may arise such a problem that when a jump is made to start reproduction from a midway of a video sequence, an I-frame shall be first decoded as aforementioned but a start point, i.e., coded video-data recorded therein can not be found because a quantity of codes is out of proportion to time.

Figure 2:
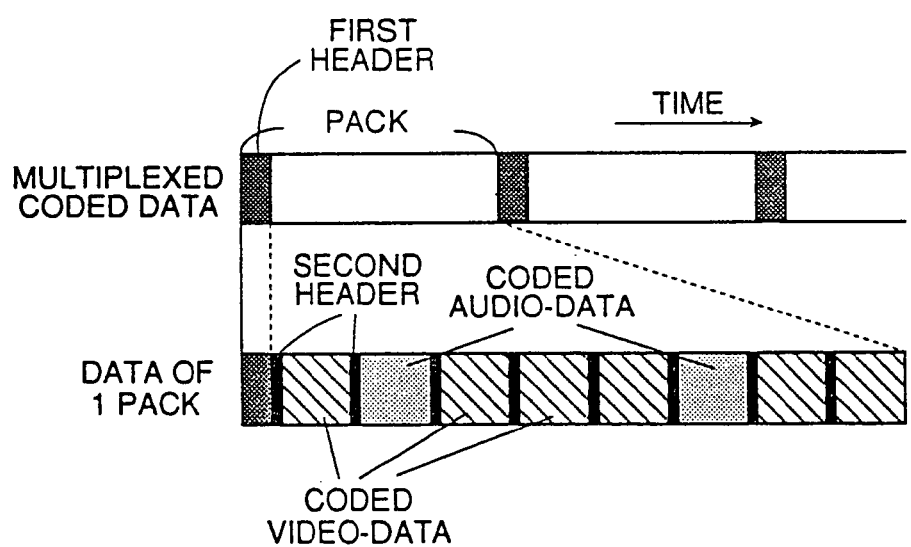
FIG. 2 is a view showing an example of conventional multiplexed coded-data.

FIG. 2 shows a structure of multiplexed coded-data recorded by the MPEG method.

The multiplexed coded-data is divided into so called packs, each of which has a first header placed at the head thereof. Each pack is composed of coded video-data with a second header and coded audio-data with a second header. The first header contains an information for synchronizing coded video-data with coded audio-data. The second header contains an information indicating what kinds of the data following thereto. Therefore, the first header must be first read out to realize synchronous reproduction of video and audio.

In view of the foregoing, the present invention was made to provide a coded data control device which is capable of reading only necessary data at the time of random access even in case that the number of codes is out of proportion to time.

Figure 3:
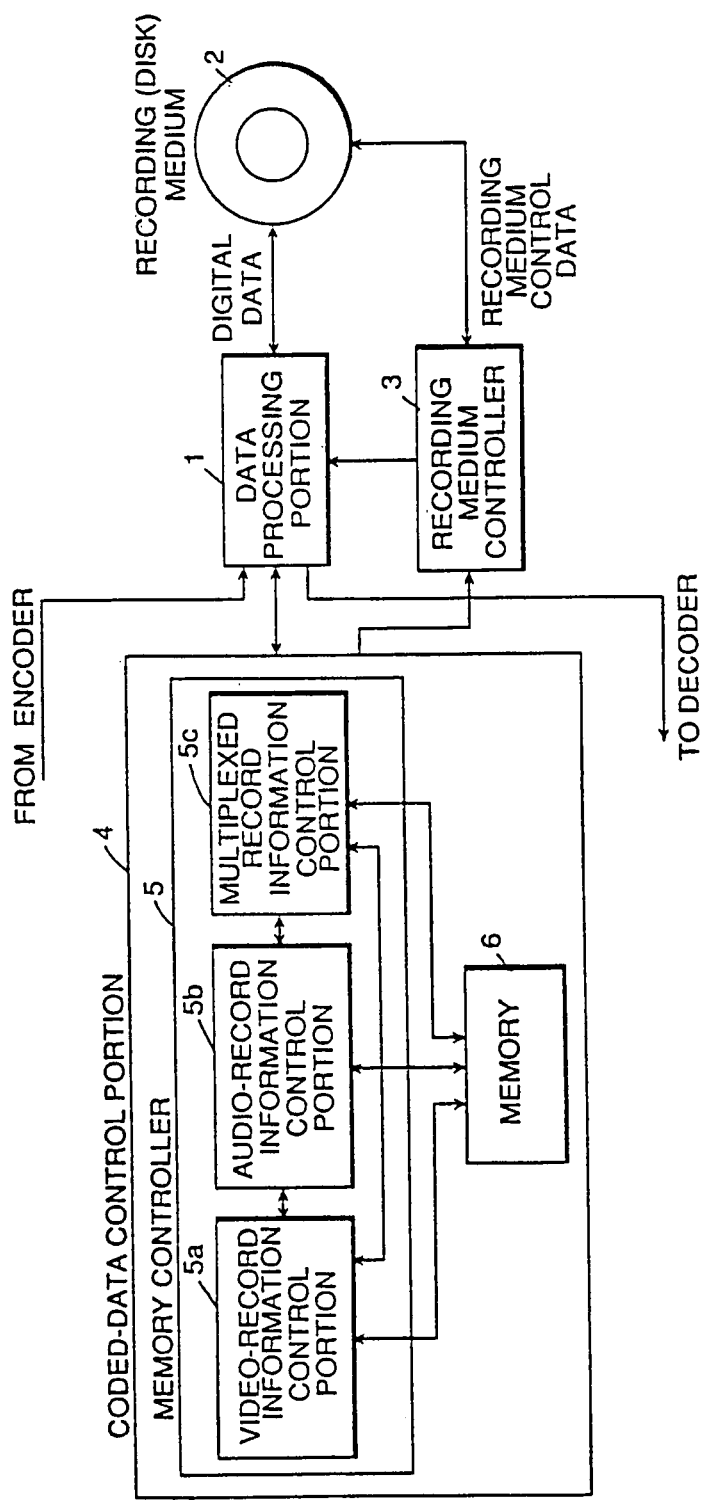
FIG. 3 is a block diagram for explaining a coded data control device embodying the present invention.

FIG. 3 is a block diagram for explaining an embodiment of a coded-data control device according to the present invention. There are a coded-data control device and a recording (disc) medium 2 in FIG. 3. The device comprises a data processing portion 1, a recording medium controller 3, a coded-data control portion 4, a memory controller 5 consisted of a video-record information control portion 5a, audio-record information control portion 5b and a multiplexed record information control portion 5c and a memory 6.

The data processing portion 1 receives multiplexed coded-data from an encoder and data from the coded-data control portion 4, divides them by sector length and outputs them to be recorded in specified sectors of the recording medium 2. Each sector number is inputted by the recording medium controller 3.

The recording medium controller 3 outputs control data for control of reading from and writing into the recording medium 2 and supplies the data processing portion 1 with the number of each sector on the recording medium for writing-in or reading-out the data. The coded-data control portion 4 stores control data which have been previously recorded in the recording medium 2 or are to be newly recorded therein.

The coded-data control portion 4 has the memory controller 5 composed of the video-record information control portion 5a, audio-record information control portion 5b and multiplexed record information control portion 5c. The memory controller 5 is connected to the memory 6 in order to manage control data stored in the memory 6. The coded-data control portion 4 controls accumulation of multiplexed coded-data composed of high-efficiently coded video-data, high-efficiently coded audio-data and additional data for multiplexing the video and audio data in the recording medium by using an intraframe-coded video frame or a video-frame encoded by prediction from a precedent frame as a key frame. Namely, this portion supplies control data which includes an information on recording position of one or two or all the coded video-data, audio-data and multiplexed coded-data for the key file in the recording medium and an information on linking with precedent and subsequent coded-data.

In the following description of the embodiment, it is assumed that multiplexed coded-data, which was encoded by the MPEG method described before as a conventional data encoding method and has a structure shown in FIG. 2, is now supplied by the encoder. A pack that contains a first recorded start position of either coded video-data in a key frame or coded audio-data corresponding to the key frame is called a key pack.

The operation of the coded-data control device when a recording medium is inserted into a recorder-player is as follows:

The recording medium controller 3 outputs control data for controlling the recording medium 2 to read out control data stored therein and enter them into the data processing portion 1. The control data from the data processing portion 1 is transferred to the coded data control portion 4 which in turn records the inputted control data in a specified address of memory 6.

The operation of the device when recording coded data is as follows:

The following operation is not performed in a video-player and is performed in a video-recorder. The data processing portion 1 divides multiplexed data from the encoder by sector length and outputs the divided coded data so that they may be recorded in specified sectors on the recording medium 2 according to the sectors' numbers inputted from the recording media controller 3.

When recording the multiplexed coded-data inputted by the encoder in the recording medium 2, the data processing portion 1 outputs the numbers of a first sector and a last sector on a continuous record area on the recording medium to the coded-data control portion 4. There are two types of video recorders, one of which can record a video-sequence (time-series pictures) as divided in a plurality of different areas on the recording medium and the other can record a video-sequence only in a continuously recording area on the recording medium. In the former case, the data processing portion 1 outputs the numbers of a first sector and a last sector for each area to the coded-data control portion 4.

The data processing portion 1 has a first header detecting portion for detecting a first header which is added by encoder as shown in FIG. 2 and a detecting portion for detecting the beginning and end of coded video-data of a key frame and the beginning and end of coded audio-data corresponding to the key frame and it outputs an information on location of records of coded video-data and multiplexed coded data corresponding to the key frame on the recording medium to the coded data-control portion 4. The beginning and end of coded video-data of a key frame can be detected by reading a header placed at the head of a video-frame. The beginning and end of coded audio-data corresponding to a key frame can be detected by reading time-information added to coded video-data and coded audio-data.

If the encoder is so constructed that it may output a flag marking the beginning of the first header and flags marking the beginning and end of coded video-data of a key frame and flags marking the beginning and end of coded audio-data corresponding to the key frame, the data processing portion 1 has no need of providing the detecting portion for detecting a first header, the beginning and end of coded video-data of a key frame and the beginning and end of coded audio-data corresponding to the key frame.

The memory controller 5 in the coded-data control portion 4 produces linking information from input data received from the data processing portion 1. The video-record information control portion 5a manages information on whereabouts of records of the coded video-data, the audio-record information control portion 5b manages information on whereabouts of records of the coded audio-data and the multiplexed record information control portion 5c manages information on whereabouts of records of multiplexed coded-data. The linking information for the video-sequence, recording areas on the recording medium and key frames recorded in the recording areas is generated from the content of the memory 6 and stored together with the record location information in the memory 6. Thus the coded-data control portion 4 may have a new control data that corresponds to coded data newly recorded on the recording medium.

When new data is recorded on the recording medium 2, the coded-data control portion 4 generates and stores a new control data but control data recorded on the recording medium 2 is still not updated. It is, therefore, needed to record the control data stored in the coded-data control portion 4 on the recording medium 2, for example, after completion of recording the new data on the recording medium 2 or before drawing the recording medium 2 from the video-recorder. It is also possible to control the recording medium 2 to periodically update the control data recorded thereon while the coded data being written thereon.

This procedure is such that the recording medium controller 3 controls the recording medium 2 to record the control data and makes the coded-data control portion 4 to successively output the stored data therefrom into the data processing portion 1 which in turn outputs the data into the recording medium.

The operation of the coded-data control device for ordinary playback of the recording medium is as follows:

The coded-data control portion 4 is assumed to already have control data read from the recording medium 2. The first and last numbers of sectors containing reproducible records of multiplexed coded-data are read-out from the coded-data control portion 4 and inputted into the recording medium controller 3. The coded data may be divided and recorded on different areas of the recording medium. In this case, the numbers of the first and last sectors for each area are read-out from the coded-data control portion 4 and entered into the recording medium controller 3.

Figure 4:
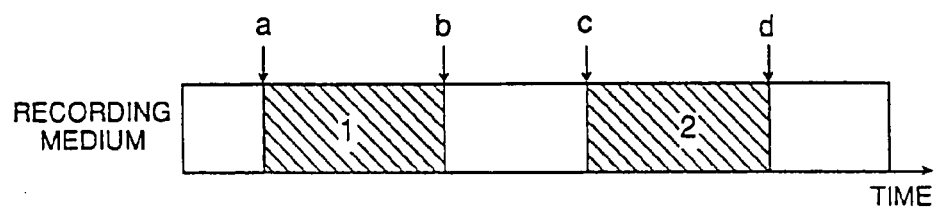
FIG. 4 is a view explaining a location of a sector number on a recording medium, which is to be inputted by the coded-data control portion of FIG. 3.

FIG. 4 illustrates an example of coded-data which is divided into two parts and recorded in two separate areas shown as hatched.

Actual recording areas on a recording disc medium are a plurality of concentric circles or spirals, but the exemplified coded data is shown, for the sake of simplicity, in the form of serial records arranged along a horizontal time-axis.

When the coded data records shown in FIG. 4 are read-out in the order of 1 and 2, the coded-data control portion 4 outputs sector numbers at positions a and b and, then, sector numbers at position c and d. The recording medium controller 3 outputs control data for reading coded data from the recording medium according to the sector numbers outputted from the coded-data control portion 4. The data processing portion 1 receives a series of multiplexed coded-data from the recording medium 2 and outputs it to a decoder.

The operation of the coded-data control device when index searching is as follows:

An information on whereabouts of records of multiplexed coded-data on the recording medium, which corresponds to a key frame to be reproduced, is outputted from the coded-data control portion 4 into the recording medium controller 3 which in turn controls, using the inputted location information, the recording medium so that the sector containing coded-data of a key pack may be accessed. The operation of the data processing portion 1 is the same as the case of ordinary playback described before.

The operation of the coded-data control device for high-speed playback is as follows:

In this case, the recording medium controller 3 controls the recording medium 2 so that coded data corresponding to a key frame may be successively accessed. The MPEG method provides, between key frames, B-frames coded each by prediction from the precedent and subsequent frames, but coded video-data of these B-frames shall not be read out in case of high-speed playback.

Once the high-speed playback mode was selected, the coded-data control portion 4 outputs an information on whereabouts of a key frame, which is to be reproduced, on the recording medium, to the recording medium controller 3 which in turn controls, using the inputted location information, the recording medium 2 to successively access the sectors containing coded-data of a key frame.

The operation for pointer edition playback is substantially similar to the above-mentioned high-speed playback operation excepting that random access is performed to discrete areas according to the linking information (pointers) contained in the control data while random access is made successively to coded-data corresponding to a key frame at the high-speed playback.

Thus in the embodiment of the present invention, the coded-data control portion 4 stores control data including information on whereabouts of coded data on the recording medium, thereby any desired data thereon can be randomly accessed quickly without reading unnecessary data.

Another embodiment will be explained by using the same block diagram shown in FIG. 3. In the present embodiment, control data recorded in a coded-data control portion 4 contains a sector number indicating the head of a key pack as an information on whereabouts of multiplexed data on a recording medium and sector numbers indicating the head and tail of coded video-data of a key frame as an information on whereabouts of the coded video-data on the recording medium.

Figure 5A:
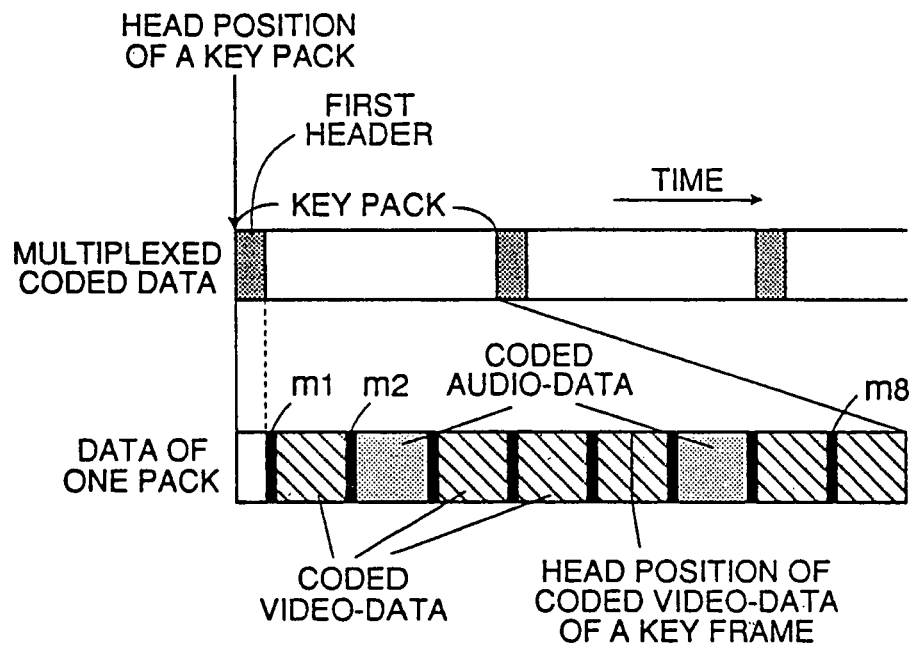
FIGS. 5A and 5B show the leading head of a key pack according to the present invention.
Figure 5B:
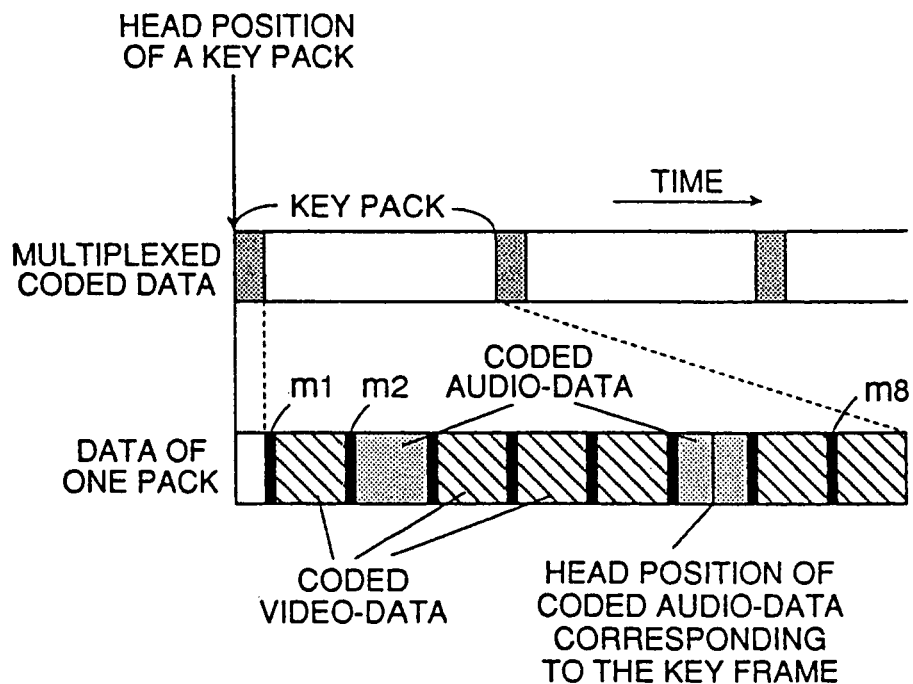

FIGS. 5A and 5B are illustrative of examples of the heads of key packs.

A key pack is a pack that contains a first recorded head of either coded video-data of a key frame or coded audio-data corresponding to the key frame. FIG. 5A shows a pack wherein the head of coded video-data of the key frame is earlier recorded and FIG. 5B shows a pack wherein the head of coded audio-data corresponding to the key frame is earlier recorded. In FIGS. 5A and 5B, m1, m2 . . . m8 are additional data for multiplexing coded data.

Figure 6:
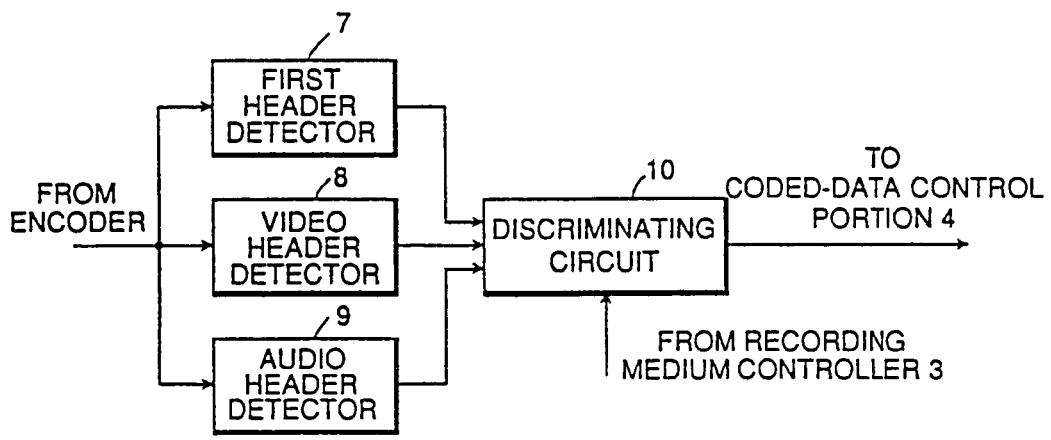
FIG. 6 shows a circuit for detecting a header of a data processing portion of the device shown in FIG. 3.

FIG. 6 is a block diagram of a header detecting circuit in the data processing portion 1 of FIG. 3. In FIG. 6, there are shown a first header detector 7, a video header detector 8, an audio header detector 9 and a discriminating circuit 10.

The data processing portion 1 includes the header detecting circuit shown in FIG. 6. When recording coded data, the first sector number for recording therein a key pack and the sector numbers for recording therein the head and tail of coded data of a key frame are outputted to the coded-data control portion 4.

The header detecting circuit shown in FIG. 6 is composed of a first-header detector 7, a video header detector 8, an audio header detector 9 and a discriminating circuit 10. The first-header detector 7, a video header detector 8 and an audio header detector 9 receives multiplexed coded-data from an encoder and detects, respectively, the first header, the header placed at the head of a video-frame and a header placed at the head of an audio-frame.

When the headers are detected, a flag is inputted into the discriminating circuit 10 which extracts the first sector number for recording therein a key pack and the of sector number for recording therein the head and tail of a coded video-data from the headers received from the first-header detector 7, the video header detector 8 and the audio header detector 9 and from sector numbers received from a recording medium controller 3 and transfer the extracted sector numbers to the coded-data control portion 4.

The headers detected by the header detecting circuit of FIG. 6 are added by an encoder disposed at the front end of the data processing portion 1. Therefore, the data processing portion 1 has no need of first-header detector 7, video header detector 8, audio header detector 9 if the flags for indicating, as shown in FIG. 2, the first header, header placed at the head of a video-frame and header placed at the head of an audio-data may be inputted by the encoder into the data processing portion 1.

The reproducible data is usually read by sector from the recording medium 2. If the head of the multiplexed data necessary for reproduction is recorded at the middle of a sector, unnecessary data may exist-before the necessary data. Therefore, a decoder disposed after the data processing portion 1 shall be provided with a header detecting circuit composed of the same first-header detector 7, video header detector 8 and audio header detector 9 as shown in FIG. 6 in order to detect the headers and eliminate unnecessary data before the headers. In the shown embodiment of the present invention, the data processing portion 1 has the header circuit of FIG. 6 that can omit the unnecessary data obtained before each header, thereby eliminating the need of providing the decoder with the above-mentioned header detecting circuits.

In the present embodiment, management of coded video-data, audio-data and multiplexed coded data, which correspond to a key frame, is carried out by using the sector numbers for recording therein the head or tail of the coded video-data, audio-data and multiplexed coded data, which correspond to the key frame. This makes it possible to effectively access any key frame.

Namely, by using the above-mentioned control (management) data it is possible to make access to a record corresponding to a key frame necessary for index searching, fast playback and pointer edition. When video and audio are played back together, it is required to use only control data relating to multiplexed coded-data, eliminating the need for control data relating to coded video-data and audio-data. Control data relating to video or audio is used to access only coded video-data or coded-audio data.

Another embodiment of the present invention will be described as follows:

The present embodiment is similar in configuration to the embodiment shown in FIG. 3 but differs by the operation of its coded data control portion.

In the present embodiment, within the playback functions using random access, data-head (index) searching feature or pointer editing feature is conducted by reading multiplexed coded-data by using information on location of multiplexed coded-data records on a recording medium, while fast playback is conducted by reading coded video-data according to information on location of coded-video-data records on the recording medium.

Accordingly, the coded-data control portion 4 inputs a sector number indicating the head position of a key pack in case of the head searching and the pointer edition and inputs sector numbers indicating the head and tail positions of coded video-data of a key frame in case of high-speed playback This is because the former case requires synchronous reproduction of video and audio while the latter case requires video-output only. The present embodiment eliminates the possibility of reading the unnecessary coded-data, thereby increasing the number of pictures to be reproduced for a unit time.

The embodiments explained above use control data which includes the sector number for recording therein the head of a key pack as information on whereabouts of multiplexed coded data on a recording medium and the sector numbers for specifying the head and tail of coded video-data of a key frame.

Another embodiment of the present invention may use, as control data, sector numbers indicating the head of a key pack and the tail of the coded video-data of a key frame, omitting sector number indicating the head of coded video-data of the key frame. In this case, the head of a key pack is always accessed when random accessing for synchronous reproduction of video output and audio output and for reproduction of video output only.

Therefore, unnecessary coded audio-data may be read-out in case of requiring video-output only. This may reduce the number of video frames to be reproduced per unit time, but may reduce the quantity of control data. By inputting a flag marking the end of a video frame from a video decoder at reproduction of coded data, there is no need of recording the tail of the coded video-data of the key frame, thereby further reducing the quantity of necessary control data. Namely, only a sector number specifying the head of a key pack is used as control data.

Figure 7:
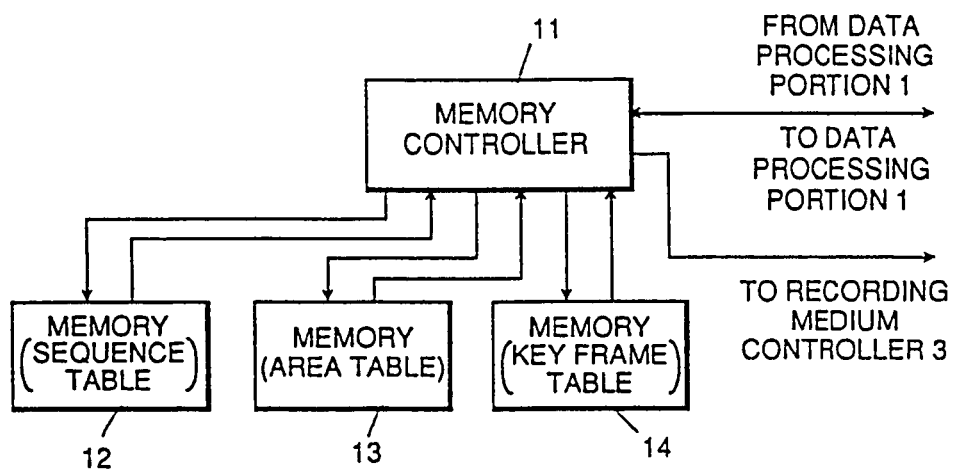
FIG. 7 is a block diagram of a coded data control portion of the device shown in FIG. 3

Another embodiment of the present invention will be described as follows:

FIG. 7 is a block diagram of a coded-data control portion of the device shown in FIG. 3. Numeral 11 designates a memory controller and numerals 12 to 14 designate memories.

As shown in FIG. 7, the coded data control portion 4 is composed of three memories 12, 13 and 14 and a memory controller 11 for controlling the memories. Each of the memories 12, 13 and 14 contains a first table (hereinafter referred to as sequence table) for controlling video-sequences, a second table (hereinafter referred to as area table) for controlling recording areas on a recording medium and a third table (hereinafter referred to as key frame table) for control of coded video-data or coded audio-data or multiplexed coded-data, which corresponds to a key frame.

FIGS. 8A and 8B shows an example of content of control data stored in each memory shown in FIG. 7. In FIGS. 8A and 8B, numeral 21 denotes a next sequence address, 22 an area table address, 23 a next area address, 24 a start sector number, 25 an end sector number, 26 a start frame address, 27 a next frame address, 28 a pack start sector number, 29 a key start sector number, 30 a key end sector frame. Addresses 21, 22, 23, 26, 27 are of pointers (linking information) and sector numbers 24, 25, 28, 29, 30 are used as location information.

The sequence table of the memory 12 contains data each by one word for one video-sequence. One-word data consists of a pointer specifying a next word (next sequence address) 21 and a pointer specifying location of an area table (area table address) 22. The next sequence address 21 indicates the order of reproducing a video-sequence and the area table address 22 indicates an address of an area table corresponding to a video-sequence. In this instance, the next sequence address 21 indicates an address of the memory 12 and last data of a next sequence address 21 linked by a pointer has a specified value indicating "the END".

The area table of the memory 13 contains data each by one word per successively recording area on a recording medium. One-word data consists of 4 elements, i.e., a pointer specifying a next word (next area address) 23, a start sector number 24 indicating a first sector number of a successively recording area, a end sector number 25 indicating a last sector number of a successively recording area and a "start frame address" pointer specifying a start address of a key frame table corresponding to a key frame contained in a successively recording area.

The area table corresponding to one-word data in the sequence table is a series of tables linked by the "next area address" pointer from an area table address specified by the area table address 22 of the sequence table. The next area address 23 indicates the address of the memory 13 but the last data linked by the pointer "next area address" 23 has a specified value indicating "the end". In case when a key frame is not recorded in an area defined by a start sector number and an end sector number, the start frame address 24 has a specified value indicating "no data".

The key frame table of the memory 14 contains data each by one word for a key frame. One-word data consists of a pointer specifying a next word (next frame address) 27, a pack start sector number 28 indicating a sector number wherein the head of a key pack is recorded, a key start sector number 29 indicating a sector number wherein the head of a coded video-data of a key frame is recorded and a key end sector number 30 indicating a sector number wherein the tail of coded video-data of a key frame is recorded. The next frame address 27 indicates an address of the memory 14 but the last data linked by the pointer "next frame address" 27 has a specified value indicating "the end".

The control data shown in FIGS. 8A and 8B lacks in information indicating which coded data of an I-frame or coded data of a P-frame is indicated by data recorded in a key frame table of the memory 14. Consequently, it may be considered, as described later, to provide each word in the key frame table with a flag specifying I-frame or P-frame or to divide the key frame table into two separate tables, i.e., an I-frame table and a P-frame table to be separately controlled.

FIGS. 9A and 9B show a relationship between control data recorded in each table of each memory of FIG. 7 and recording areas.

A plurality of video sequences can be recorded on a recording medium 2. One video sequence may be successively recorded in a continuous recording area or may be divided and recorded in a plurality of separate recording areas on the recording medium. In FIGS. 9A and 9B, there are shown three video-sequences: a video-sequence 1 is recorded as divided into three parts and written in three separate recording areas on the recording medium.

Three video-sequences 1, 2 and 3 are assumed to be reproduced in the order of video-sequences 1, 2 and 3.

In the case of FIGS. 9A and 9B, the sequence table contains three one-word data which correspond to the video-sequences 1, 2 and 3 respectively. The first one-word data corresponds to the video sequence 1, the next sequence address of the video sequence 1 indicates the one-word data corresponding to the video sequence 2 and the next sequence address of the video sequence 2 indicates the one-word data corresponding to the video sequence 3. An area address of the sequence table indicates an address of first area table data corresponding to the video sequence.

Each one-word data of the area table corresponds to a continuous recording area on the recording medium 2. Namely, in the case of FIGS. 9A and 9B, the area table contains three one-word data corresponding to the video sequence 1. Thus in the case that a plurality of area tables exists, a next area address of the area table indicates a next area table data. In one-word data of the area table, the start sector number indicates a first sector number of a continuous area and the end sector number indicates a last sector number thereof. This continuous area is used for recording therein coded data of a plurality of key frames. Sector number for recording therein coded data of the first key frame is managed by a key frame table specified by a start frame address.

In one-word data of the key frame table, the pack start sector number indicates the sector number for recording therein the head of a key pack, the key start sector number indicates the sector number for recording therein the head of a coded video-data of a key frame and the end sector number indicates the sector number for recording therein the tail of a coded video data of the key frame. The next frame address indicates a next key frame table data.

Figures 10, 10A, 10B:
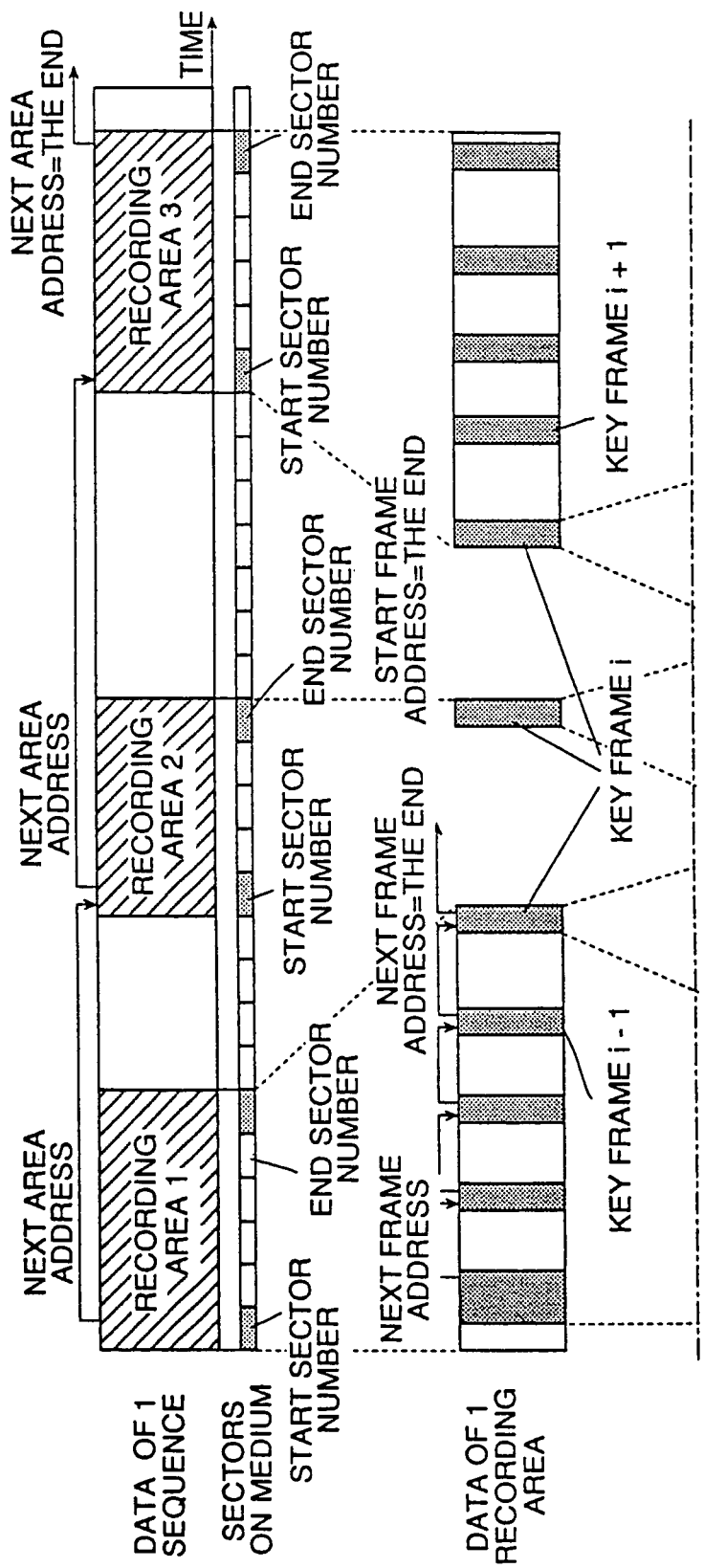
FIGS. 10A and 10B are another views showing a relationship between control data recorded in a coded data control portion and a recording area of a recording medium according to the present invention.

FIGS. 10A and 10B show an example of coded data in a particular case that coded data of a key frame is distributed over a plurality of areas to be controlled by a plurality of area tables.

In the case of FIGS. 10A and 10B, coded data of key frame i is recorded as extending over three areas 1, 2 and 3. As shown in FIGS. 10A and 10B, a sector number specifying the head of coded video-data of a key frame is recorded in a "key start sector number" of the last key frame table, which corresponds to the recording area 1. A sector number specifying the tail of coded video-data is recorded in a "key end sector number" which is a sector number of the recording area 3. Since the recording area 2 has no key frame table corresponding thereto, data indicating "no data" is recorded in the start frame address of the recording area 2. The start frame address of the recording area 3 indicates the key frame table of key frame i+1.

In fast playback, the key start sector number and the key end sector number in the key frame table are inputted into the recording medium controller 3 which in turn controls the recording medium 2 to read-out data from the areas defined by the key start sector number and the key end sector number. When the key frame i shown in FIGS. 10A and 10B is reproduced, the key start sector number and the key end sector number corresponding to the key frame of the key frame table i and the key end sector number indicate different recording areas. However, even in this case, it can be recognized from the information recorded in the area table that the areas 1, 2 and 3 are to be reproduced in the order of their numbers. The recording medium controller 3 makes access to the record areas 1, 2 and 3 in the numbered order and reads data to the key end sector number included.

The operations of the memory controller 11 and the memories shown in FIG. 7 will be described further in detail as follows:

Once a recording medium was inserted into a recorder-player, control data recorded in the recording medium 2 is inputted into the memory controller 11 which controls memories 12, 13 and 14 to store the respective control data.

FIGS. 11A and 11B are a flow chart for explaining the operation of the memories when recording coded data in a recording medium. Each table to be used has a structure shown in FIGS. 8A and 8B. FIGS. 12A and 12B show a process of changing control data.

In the sequence table of the memory 12 shown in FIGS. 8A and 8B, one-word data is recorded after the tail end of already recorded data and data as to the area table of memory 13 and the key frame table of the memory 14, which correspond to the added data of the sequence table, are also additionally recorded. In FIGS. 12A and 12B, the already stored data is shown by a solid line and the additionally recorded control data is shown by a dotted line.

In the following description, addresses of the memory 12 are referred to as ad12, ad112, addresses of the memory 13 ad13, adn13 and addresses of the memory 14 ad14, adn14 respectively. Before recording operation, the recording medium controller 3 of FIG. 3 controls vacant areas of the memories on the basis of control data and controls each memory to store data in each sector of the vacant area thereof.

Referring to FIGS. 11A and 11B, the operation of the device will be explained. The operation steps (S) are as follows:

The S101 to S104 sets the sequence table of the memory 12. Vacant areas of the memory 12 and the memory 13 are searched and determined as ad12 and ad13 respectively (S101). The area table address of ad12 is set at ad13 and a next sequence address is set at "the end" (S102). The address of the last one of data linked by a "next sequence address" pointer of the sequence table of the memory 12 is set at ad112 (S103). A next sequence address of ad112 is set at ad12 (S104). The sequence table now has new one-word data "ad12" added at its tail end.

The area table of the memory 13 is set.

The coded data control portion 4 receives the first sector number in continuous recording area on the recording medium 2. This input data is used as a start sector number of ad13 (S105). The vacant area in the key frame table of the memory 14 is searched and determined as ad14 (S106). A start frame address of ad13 is set at ad14 (S107). Then, the sector number for recording therein the head of a key pack and two sector numbers indicating the head and the tail, respectively, of coded video-data are inputted. These three sector-numbers are set as "pack start sector number", "key start sector number" and "key end sector number", respectively, of the vacant area ad14 (S108).

The continuous recording area of the recording medium 2 is checked for whether it ended or not (S109). If not, a vacant area of the memory 14 is searched and determined as adn14 (S110). A next frame address of ad14 is set at adn14, then updating is made so that ad14 indicates adn14 (S111). The operation returns to S108. The loop from S108 to S111 writes the sector numbers specifying the coded data of a key frame, which shall be recorded in a continuous area on the recording medium, into the key frame table.

If the continuous recording area of the recording medium 2 ended at 109, the last sector number of the recording area, which is an inputted sector number, is recorded into an "end sector number" of the area table ad13 (S112) and a "next frame address" of ad14 of the key frame table is set to "the end". The S105 to S113 sets one-word data in the area table.

S114 judges whether input data ended or not. If not, a vacant area of the area table is searched and determined as adn13 (S115). A next frame address of ad13 is set at adn13, then updating is made so that ad14 indicates adn14 (S116). The operation returns to Step S105. The loop from S105 to S116 generates new data in the area table, which is linked by a pointer with precedent data in the area table, and records sector numbers for a series of key frames, which is specified by the area table data, in the key frame table. If the end of the input data is recognized at Steps 114, the "next area address" of ad13 is set to "the end" (S117) and the operation is finished.

Figure 13:
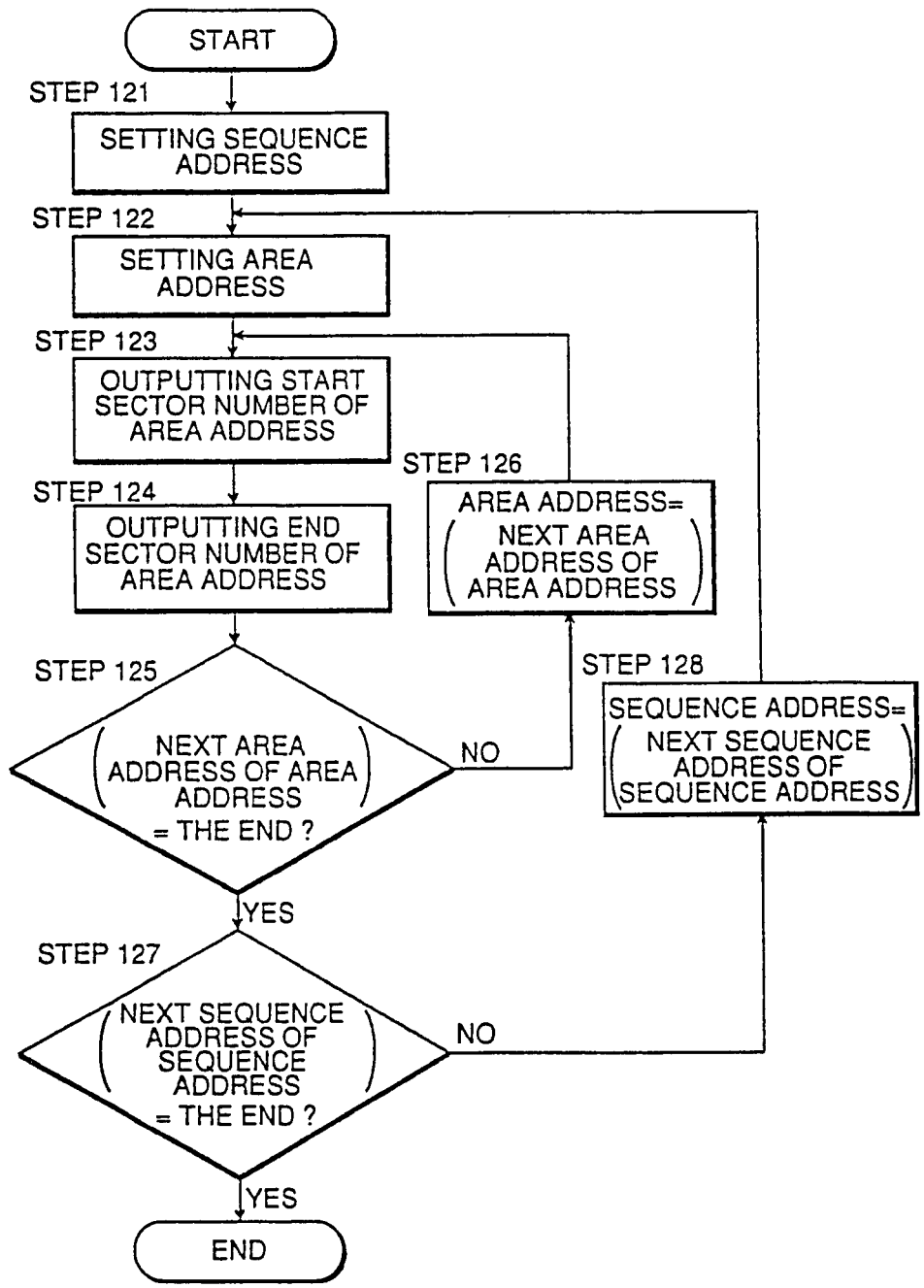
FIG. 13 is a flow chart for explaining how a coded-data control portion of a device according to the present invention operates at the time of ordinary playback of coded data.

The operation of the coded-data control device at the time of ordinary playback of coded data is as follows:

In case of the ordinary playback, a start sector number and an end sector number of the area table, which correspond to a video sequence to be reproduced, are inputted into the recording medium controller 3. FIG. 13 is illustrative of a flow chart of the operation of the device at the time of ordinary reproduction of the coded data. Two pointers of "sequence address" and "area address" are used for indicating addresses of a sequence table and an area table, respectively, which correspond to data being reproduced. Each table has a structure shown in FIGS. 8A and 8B.

The operation steps (S) are as follows:

A sequence address and an area address are first set (S121-S122), then values of a "start sector number" and an "end sector number" of the area address are outputted to the recording medium controller 3 (S123, S124). Using a first sector number and a last sector number of a continuous record area inputted from the coded-data control portion 4, the recording medium controller 3 controls the recording medium 2 to read-out the data recorded in the continuous record area of the recording medium 2.

A next area address of the area address is checked for whether it is set at "the end" or not (S125). If not, there is still left the area table data corresponding to the sequence address. The area address is, therefore, changed to the next area address of the area address and the pointer is advanced (S126), then the operation returns to S123. The loop from S123 to S126 realizes subsequent output of the first and last sector numbers for a plurality of continuous record areas on the recording medium 2, which corresponds to one-word data in the sequence table.

If the next area address ended at S125, a next, sequence address of the sequence address is checked for whether it is set to "the end" or not (S127). If not, there remains the video sequence recorded on the recording medium 2. The sequence address is, therefore, changed to the next sequence address of the sequence address and the pointer is advanced (S128), then the operation returns to S122. The loop from S122 to S128 realizes subsequent output of the first and last sector numbers for a continuous record area until the video sequence recorded on the recording medium 2 comes to end.

Figure 14:
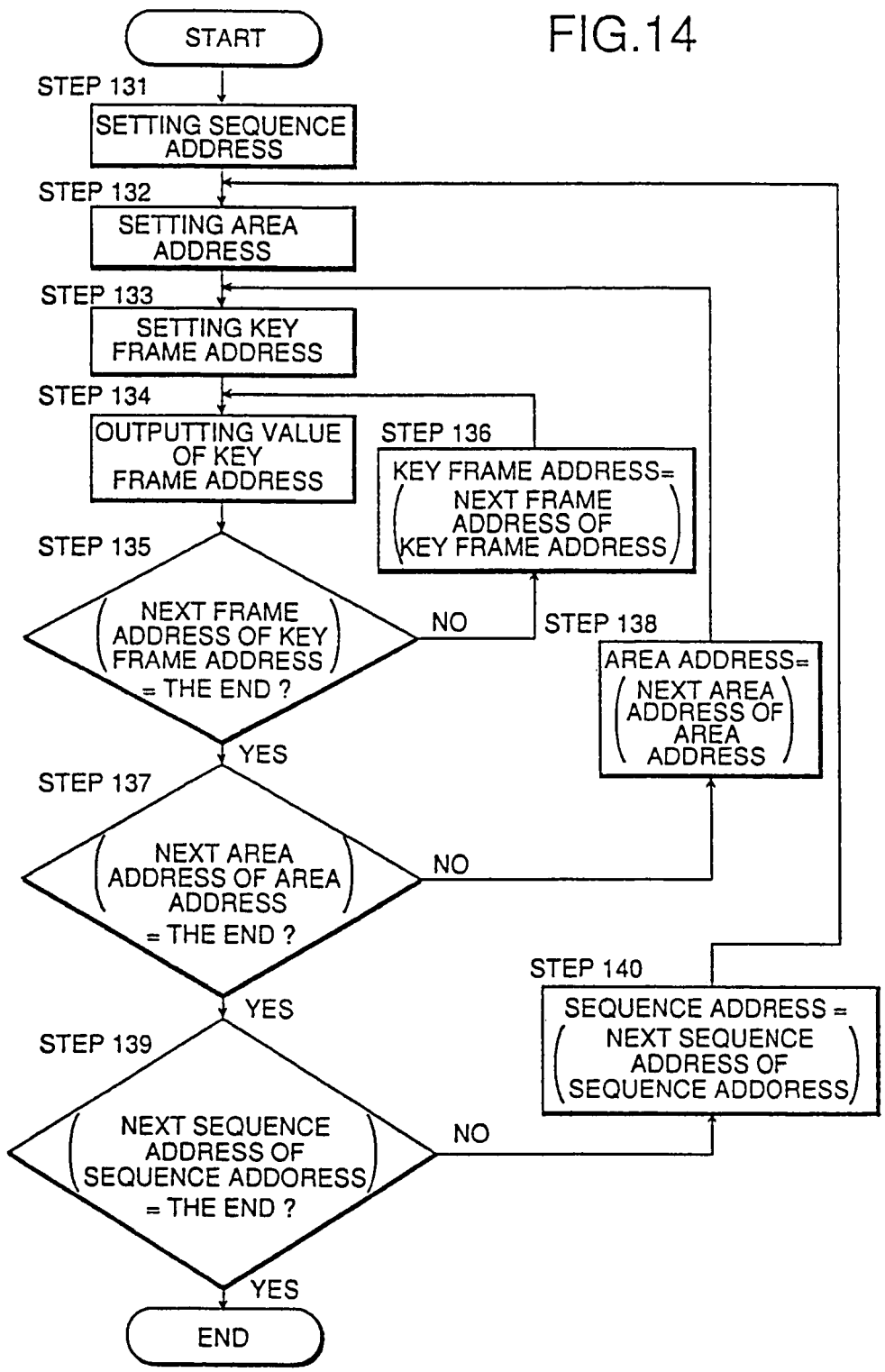
FIG. 14 is a flow chart for explaining how a coded-data control portion of a device according to the present invention operates at the time of high-speed playback of coded data.

FIG. 14 is illustrative of a flow chart of the operation of the device at the time of fast playback of the coded data. In case of the fast playback, the sector numbers wherein the head and tail of coded video-data of a key frame, which are recorded in the key frame table, are read-out and entered into the recording medium controller 3. Three pointers of "sequence address", "area address" and "key frame address" are used for indicating addresses of a sequence table, an area table and a key frame table, respectively, which correspond to data being reproduced.

The operation steps (S) are as follows:

A sequence address, an area address and a key frame address are first set (S131-S133), then a "start sector number", an "end sector number" of the key frame address are outputted to the recording medium controller 3 (S134). The recording medium controller 3 controls the recording medium 2 so that the coded video-data of the key frame are read-out by using the first and last sector numbers inputted from the coded-data control portion 4.

A next frame address of the key frame address is checked for whether it is set at "the end" or not (S135). If not, the next key frame table contains a sector number to be next accessed. The key frame address is, therefore, changed to the next frame address of the key frame address and the pointer is advanced (S136), then the operation returns to S134. The loop from S134 to S136 outputs a plurality of sector numbers recorded in the key frame table, which correspond to one-word data in the area table, to the recording medium controller 3.

If the next frame address ended at S135, a next area address of the area address is checked for whether it is set to "the end" or not (S137). If not, there remains area the table data corresponding to the sequence address. The area address is, therefore, changed to the next area address of the area address and the pointer is advanced (S138), then the operation returns to S133. The loop from S133 to S138 realizes subsequent output of the sector numbers of coded video-data of the key frame, which correspond to one-word data of the sequence table.

If the next area address ended at S137, a next sequence address of the sequence address is checked for whether it is set to "the end" or not (S139). If not, there remains the video sequence recorded on the recording medium 2. The sequence address is, therefore, changed to the next sequence address of the sequence address and the pointer is advanced (S140), then the operation returns to S132. The loop from S132 to S140 realizes subsequent output of sector numbers corresponding to the coded video-data of the key frame until the video sequence recorded on the recording medium 2 comes to end.

In the example of FIG. 14, all sector numbers recorded in the key frame table are outputted. Namely, all key frames will be reproduced but, in case of very fast playback, some frames may be omitted and not outputted. To decode a P-frame, it is needed to use a decoded precedent I-frame or P-frame. Therefore, if I-frames or P-frames in a GOP (group of pictures) were omitted, it is impossible to decode P-frames after the omitted frames in the GOP.

Figure 15:
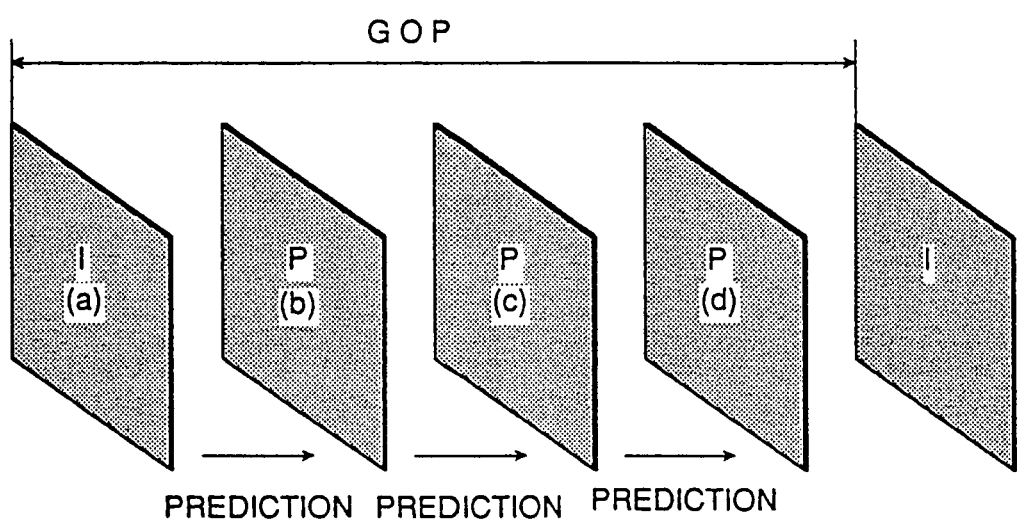
FIG. 15 is a view for explaining a frame to be omitted and a frame not to be decodable within a group of pictures (GOP) according to the present invention.

When frame (c) in the GOP of FIG. 15 was omitted, frame (d) can not be decoded for lack of the decoded image of the frame (c) whereto the frame must refers. Similarly, frames (c), (d) can not be decoded if frame (b) was omitted, and frames (b), (c), (d) can not be decoded if frame (a) was omitted. In case of the high-speed playback, it is necessary to determine a frame to be omitted (not to be outputted) by calculation from the reproduction rate of the high-speed playback since the number of frames unable to be decoded depends upon what frame is omitted.

Figures 16, 16A:
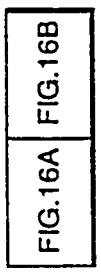

FIGS. 16A and 16B show another example of control data to be recorded in the coded-data control portion 4 shown in FIG. 3. Reference numerals shown in FIGS. 16A and 16B are the same that used in FIGS. 8A and 8B.

This example is of the case that a signal indicating the end of a key frame is inputted from a decoder. Namely, the present example corresponds to the case that key end sector numbers, which are elements of a key frame table, are eliminated from the exemplified control data of FIGS. 8A and 8B to be recorded in the coded-data control portion 4. Consequently, in the present example, the coded-data control portion may have smaller capacity than in the example of FIGS. 8A and 8B.

The operation of the present embodiment differs from the example of FIGS. 8A and 8B in the case of high-speed playback. Namely, in case of high-speed playback with control data of FIGS. 8A and 8B, the recording controller 3 recognizes the end of a key frame by the outputted key end sector number of the key frame table, but the present embodiment has no output data indicating the end of a key frame from the key-frame table and, therefore, the recording medium controller 3 recognizes the end of the key frame by an input signal from a decoder. In the case of ordinary playback or pointer edition playback, there is no need of using the key frame end signals and therefore the control operation is the same as the example of FIGS. 8A and 8B.

FIGS. 17A and 17B are illustrative of another example of control data, where reference numerals are similar to those shown in FIGS. 16A and 16B.

In the present example, the head position of a key pack is accessed at random accessing for synchronous reproduction of video output and audio output or reproduction of only video output after a key-frame-end signal is received from the decoder. As described before, in this example, the video-only reproduction may be performed with reading unnecessary coded audio-data, thereby the number of video-frames to be reproduced, for example, in high-speed mode is correspondingly reduced but the quantity of control data may be reduced.

In reproduction with index searching, high-speed playback and pointer edition, it is necessary to discriminate I-frames among all key frames to be managed. In the examples of FIGS. 8A, 8B; 16A, 16B and 17A, 17B, I-frames can be selected if the key frame table is used for controlling only I-frames, but I-frames can hardly be discriminated from P-frames if the key frame table is used to control both I-frames and P-frames.

Figure 18:
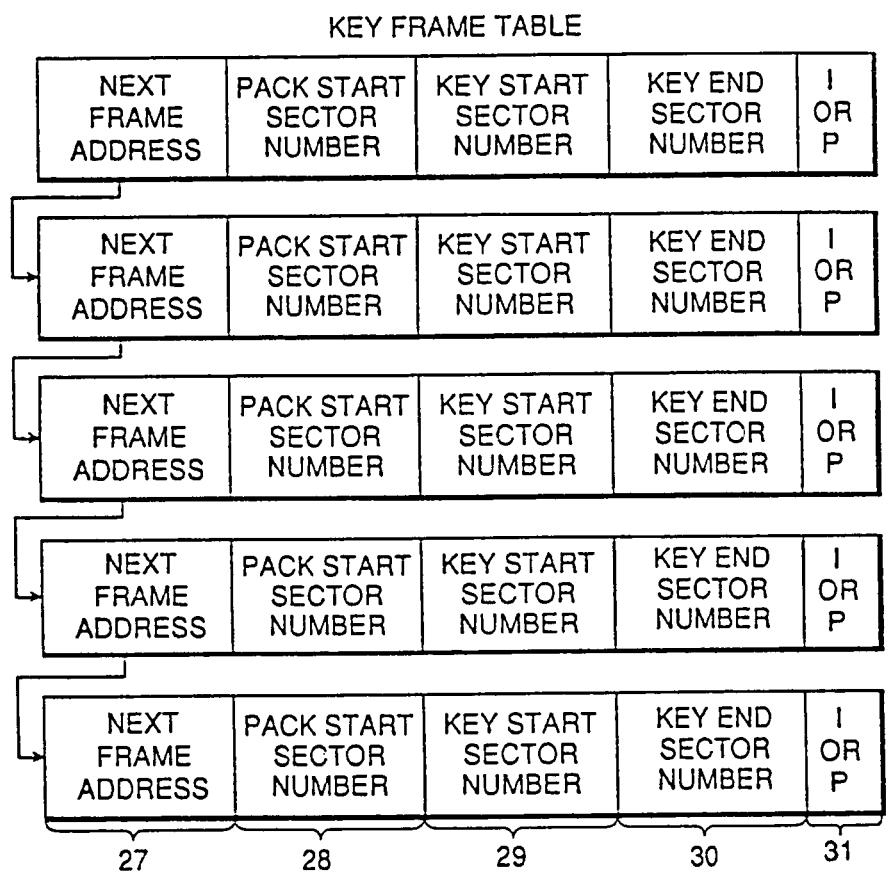
FIG. 18 shows another example of structure of a key frame table according to the present invention.

Accordingly, as shown in FIG. 18, each one-word data in the key frame table is given a one-bit flag 31 indicating I-frame data or P-frame data, thereby any key frame can be discriminated to be an I-frame or a P-frame. The key frame table of FIGS. 17A and 17B is prepared by adding one-bit flags one to each frame in the frame table of FIGS. 8A and 8B. The key frame tables of FIGS. 16A, 16B and 17A, 17B can be also modified by adding a one-bit flag to each one-word data therein. By doing so, I-frames can be discriminated from P-frames.

Figure 19:
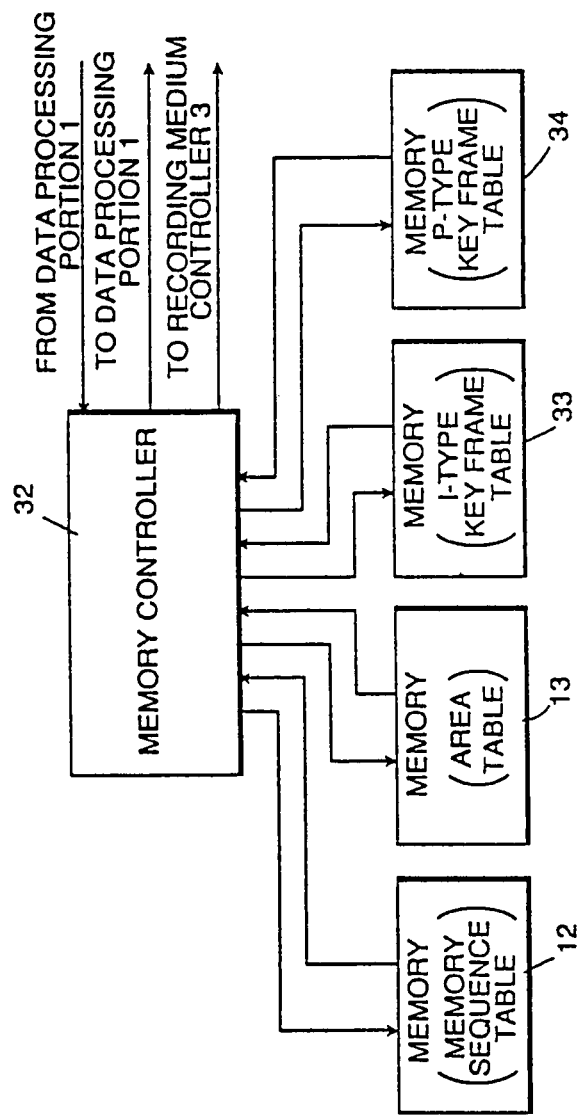
FIG. 19 is a block diagram showing another example of a coded-data control portion of the device shown in FIG. 3.

An embodiment of the present invention will be described as follows:

FIG. 19 is a block diagram showing another embodiment of a coded-data control portion of the device shown in FIG. 3. In FIG. 19, numeral 32 designates a memory controller and numerals 33 and 34 designate memories. Other components similar in function to those shown in FIG. 7 are given the same reference numerals.

The coded-data control portion 4 is composed of four memories 12, 13, 33 and 34 and a memory controller 32. The memories 12 and 13 are similar to those shown in FIG. 7. The memory 33 stores a fourth table for control of information on record positions of I-frames on a recording medium (hereinafter referred to as I-type key frame table) while the memory 34 stores a fifth table for control of information on record positions of P-frames on a recording medium (hereinafter referred to as P-type key frame table). FIGS. 20A and 20B are illustrative of an example of control data to be recorded in the I-type key frame table and the P-type key frame table. In FIGS. 20A and 20B, there are shown following elements: a next I-frame address 41, a pack start-sector number 42, an I-key start-sector number 43 for an I-frame, an I-end start-sector number 44 for an I-frame, a P-frame address 45, a next P-frame address 46, a P-key start-sector number 47 for a P-frame, a P-end start-sector number 48 for a P-frame. Addresses 41, 45, and 46 are pointers (linking information) and sector numbers 42, 43, 44 and 45 are used as information of record positions.

Each table is constructed similarly to the key frame table of FIGS. 8A and 8B. The I-type key frame table, however, differs from the key frame table of FIGS. 8A and 8B by being provided with pointers indicating P-frame addresses of the P-type key frame table. The P-type key frame table has no need of having information on key pack location since it is intended to be used only in the case of fast playback.

In the example of FIGS. 20A and 20B, an I-type key frame table, which contains one-word data corresponding to one frame, is linked by a P-frame address 45 therein with a series of word data of the P-type key frame tables which are linked with each other by a next P-frame address 46.

In a video recorder-player using a coded-data control device according to the present invention, it is possible to change the reproducing order or erase video sequence or its part by changing only the sequence table of the memory 12, the recording area table of the memory 13 and the key frame table of the memory 14, eliminating the need of changing coded data. For instance, one video-sequence can be erased by disconnecting one-word data of the sequence table, which corresponds to the video-sequence to be erased, from the next sequence address pointer.

In case of changing the order of reproducing video-sequences it is needed to only change the order of "next sequence address" pointers. When it is desired to erase a video-sequence leaving a specified portion, data of the area table, which corresponds to the portion to be erased, is disconnected from a "next area address" pointer, and a start sector number and an end sector number, which match with the portion not to be erased, are set. In the case of pointer edition, control data indicating the new reproduction order is built up from the original control data and stored separate from the original control data. By doing so, it is possible to enjoy a variety of video reproduction keeping the original sequence unchanged.

For writing new data into each table, it is needed to manage unused addresses therein. There may be several methods for managing unused addresses, for example, by providing an unused area control table for each table or by searching an unused address along pointers. The control of unused addresses can be also performed as shown in FIGS. 21A and 21B.

An embodiment of the present invention will be described as follows:

FIGS. 21A and 21B are views of memory tables wherein a one-bit flag showing the address being used or unused is added to each one-word data. In FIGS. 21A and 21B, numerals 51, 52 and 53 denote flags indicating that the address is used or unused. Other components similar in function to those shown in FIGS. 8A and 8B are given the same reference numerals. Each table of FIGS. 21A and 21B is prepared by adding flags 51-53 one to each word in the example of FIGS. 8A and 8B, which is defined in claim 5. This feature can also be applied to the examples of FIGS. 16A, 16B; 17A, 17B; 18 and 20A, 20B.

In the above-mentioned example, control data is built up when recording coded data and fast playback is performed with random accessing by using the control data. Accordingly, if a recording medium has only coded data recorded thereon with no control data, it is needed to construct necessary control data.

An embodiment of the present invention, i.e., how to build up the control data in the embodiment of FIG. 3 will be described as follows:

The recording medium controller 3 outputs recording medium control data to read-out all data recorded on the recording medium 2 from the beginning to the end. The data processing portion 1 contains detection circuits which detect the beginning and end of each video-sequence, pack and key frame respectively. The sector numbers wherein the head and tail of each video-sequence are recorded, the sector numbers wherein the head of each key pack is recorded and the sector numbers wherein the head and the tail of coded video-data are recorded are outputted from the data processing portion 1 into the coded data control portion 4 which in turn records additional control data in similar way when recording coded-data.

In the above-described examples, location of records on a recording medium is specified by sector numbers but is not limited to such expression. It may also depend upon kinds of recording media. For example, some kinds of media use the expression of record track instead of sector.

The coded data control device according to the present invention, it is possible to record information on location of key frames (to be used as reference frames at the time of coded data reproduction) as control data when recording data encoded by the MPEG method on a recording medium and to correctly access any key frame by using the recorded control data, thereby realizing functions such as index searching, fast playback, edition and etc.

As is apparent from the foregoing, the present invention offers the following advantages:

Information on record locations of coded video-data, coded audio-data and multiplexed coded-data, which correspond to each key frame, on a recording medium is stored as control data. This makes it possible to easily find location of any desired key frame on the recording medium. Quick random access to coded data can be realized without reading unnecessary data.

The heads and tails of coded video-data, coded audio-data and multiplexed coded-data, which correspond to a key frame, are used as control data. Therefore, it is possible to make random access to the desired data without reading unnecessary data and to realize quick search of the desired data head. Namely, the number of video-frames to be reproduced per unit time at high-speed playback can be increased and correct access to a connection between pictures can be effectively carried out for pointer edition reproduction.

Multiplexed coded data is accessed to synchronously reproduce video output and audio output while only coded video-data is accessed to reproduce video output only. This enables reproduction of an increased number of pictures per unit time when high-speed video-only playback is required.

Control data is organized in such hierarchy that a video-sequence is ranked first, a recording area is ranked second and location of key frame in a recording area is ranked third. This hierarchical structure assures easy updating of the control data in the case of recording a new video sequence, erasing a video sequence or changing the order of reproduction of video sequences.

Control data corresponding to key frames to be recorded in a recording area is held in such a hierarchical structure that an I-frame and a subsequent thereto P-frame. This makes it possible to control I-frames and P-frames separately from each other. Accordingly, it is possible to adaptively select frames to be reproduced at a high speed (according to the playback speed) since I-frame and P-frame can be discriminated from each other and be easily found on the recording medium. Information on interlink of control data in the same hierarchy and control data in different hierarchies is given by pointers indicating the reproduction order of coded data in each table and pointers indicating connection of one table with another. By adaptively editing these pointers, it is possible to easily record and erase any video sequence, change the order of reproducing video-sequences, erase a part of a video-sequence or change of the order of reproducing pictures of a video-sequence.

Each word of control data is provided with a one-bit flag indicating that the word is used or unused, i.e., each area of control data memory is vacant or occupied. This makes it easier to control vacant areas of control data memories.

Control data can be built up if a recording medium has no record of control data thereon. Namely, the recording medium with control data rewritten therein can be reproduced with random accessing without read-out unnecessary data.

As described above, a video sequence coded by interframe prediction according to the MPEG method allows random access only to specified key frames. The coded data control device according to the present invention controls record positions of coded video-data, coded audio-data and multiplexed coded-data, which correspond to each key frame, and can directly access any desired key frame by using the control data, thereby allowing one to effectively perform with ease high-speed playback and edition of pointers. Furthermore, it can treat video accompanied with audio.

The invention claimed is:

1. A reproducing apparatus for reproducing multiplexed coded data and control data from a recording medium,
the multiplexed coded data is composed of coded audio-data, coded video-data and additional data for multiplexing coded audio-data and coded video-data,
said coded video-data including key frame data and other frame data,
the control data not being part of said multiplexed coded data and being recorded separately from the multiplexed coded data so that the control data can read/write independently from said multiplexed data, said reproducing apparatus comprising:
a recording medium controller for reading the multiplexed coded data and control data, wherein the control data includes key-frame location information, the key-frame being at least one of an I-frame and P-frame, said key-frame location information including at least one of video location information which indicates a position of coded video-data of a key-frame, audio location information which indicates a position of coded audio-data corresponding to a key-frame, multiplexed location information which indicates a position of multiplexed coded data which synchronously reproduces coded video-data of the key-frame and corresponding coded audio-data, and
a coded data control portion which includes memory area, wherein the control data in said memory area indicates the location of key frame data.

2. A reproducing apparatus as defined in claim 1, the frames of said coded video-data in said multiplexed code data are located in the order in which they were encoded.

3. A reproducing apparatus as defined in claim 1, the multiplexed coded data are recorded as a plurality of data-packs.

4. A reproducing apparatus as defined in claim 3, the key-frame location information including coded video-data information or multiplexed coded data information, wherein coded video-data information indicates a data-pack which includes head position of key-frame$_1$ multiplexed coded data information indicates a data-pack to reproduce from a key frame.

5. A reproducing apparatus as defined as in claim 1, said coded data control portion further includes another memory areas, the control data in said another memory areas indicates the order of reproduction sequence and the information of recording area on the recording medium.

6. A recording apparatus for recording multiplexed coded data and control data to a recording medium,
the multiplexed coded data is composed of coded audio-data, coded video-data and additional data for multiplexing coded audio-data and coded video-data,
said coded video-data including key frame data and other frame data, the control data not being part of said multiplexed coded data and being recorded separately from the multiplexed coded data so that the control data can read/write independently from said multiplexed data,
said recording apparatus comprising:
a recording medium controller for recording the multiplexed coded data and control data;
a coded data control portion for controlling the generation of the control data according to the multiplexed coded data to be recorded to the recording medium, wherein the control data includes key-frame location information, the key-frame being at least one of an I-frame and P-frame,
said coded data control portion further comprises memory area, wherein the control data in said memory area indicates the location of key frame data.

7. A recording apparatus defined as in claim 6, the frames of said coded video-data in said multiplexed code data are located in the order in which they were encoded.

8. A recording apparatus defined as in claim 6, the multiplexed coded data are recorded as a plurality of data-packs.

9. A recording apparatus as defined in claim 8, the key-frame location information including coded video-data information or multiplexed coded data information, wherein coded video-data information indicates a data-pack which includes head position of key-frame, multiplexed coded data information indicates a data-pack to reproduce from a key frame.

10. A recording apparatus as defined in claim 6, said coded data control portion further includes another memory areas, the control data in said another memory areas indicates the order of reproduction sequence and the information of recording area on the recording medium.

* * * * *